(12) United States Patent
Shi et al.

(10) Patent No.: US 8,358,704 B2
(45) Date of Patent: Jan. 22, 2013

(54) FRAME LEVEL MULTIMEDIA DECODING WITH FRAME INFORMATION TABLE

(75) Inventors: Fang Shi, San Diego, CA (US); Seyfullah Halit Oguz, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1517 days.

(21) Appl. No.: 11/696,071

(22) Filed: Apr. 3, 2007

(65) Prior Publication Data

US 2007/0291836 A1    Dec. 20, 2007

Related U.S. Application Data

(60) Provisional application No. 60/789,443, filed on Apr. 4, 2006.

(51) Int. Cl.
*H04N 11/04*    (2006.01)
(52) U.S. Cl. .................................. 375/240.27; 714/746
(58) Field of Classification Search .............. 375/240.27
See application file for complete search history.

(56) References Cited

U.S. PATENT DOCUMENTS

| | | | |
|---|---|---|---|
| 6,530,055 B1 | 3/2003 | Fukunaga | |
| 6,614,847 B1* | 9/2003 | Das et al. | 375/240.16 |
| 6,621,865 B1* | 9/2003 | Yu | 375/240.16 |
| 2003/0014705 A1 | 1/2003 | Suzuki et al. | |
| 2007/0011716 A1* | 1/2007 | Koslov et al. | 725/135 |
| 2007/0083578 A1 | 4/2007 | Chen | |
| 2007/0086515 A1* | 4/2007 | Kirkenko et al. | 375/240.1 |
| 2007/0223582 A1* | 9/2007 | Borer | 375/240.12 |

FOREIGN PATENT DOCUMENTS

| | | |
|---|---|---|
| EP | 1608182 | 12/2005 |
| JP | 2000307672 | 11/2000 |
| JP | 2006506904 A | 2/2006 |
| KR | 1020030006881 | 1/2003 |
| WO | WO2006012384 | 2/2006 |

OTHER PUBLICATIONS

Puri et al., "Forward error correction (FEC) codes based multiple description coding for internet streaming and multicast", May 2001, Signal Processing: Image Communication 16, pp. 745-762.*
International Search Report and Written Opinion—PCT/US2007/065940—ISA/EPO—Aug. 20, 2009.

(Continued)

*Primary Examiner* — David Pearson
*Assistant Examiner* — Thaddeus Plecha
(74) *Attorney, Agent, or Firm* — Brent A. Boyd

(57) ABSTRACT

Apparatus and method to decode video data while maintaining a target video quality using an integrated error control system including error detection, resynchronization and error recovery are described. Robust error control can be provided by a joint encoder-decoder functionality including multiple error resilience designs. In one aspect, error recovery may be an end-to-end integrated multi-layer error detection, resynchronization and recovery mechanism designed to achieve reliable error detection and error localization. The error recovery system may include cross-layer interaction of error detection, resynchronization and error recovery subsystems. In another aspect, error handling of a scalable coded bitstream is coordinated across a base-layer and enhancement layer of scalable compressed video.

82 Claims, 16 Drawing Sheets

OTHER PUBLICATIONS

Stockhammer T: "Robust system and cross-layer design for H.264/AVC-based wireless video applications" EURASIP Journal on Applied Signal Processing 2006 Hindawi Publishing Corporation US, vol. 2006, Mar. 31, 2006, pp. 1-15, XP002534093.

Wang et al., "Error Control and Concealment for Video Communication: A Review", Proceedings of the IEEE, IEEE., New York, US, vol. 86, No. 5, May 1, 1998.

Wen-Nung Lie et al: "Error Resilient Coding Based on Reversible Data Embedding Technique for H. 264/AVC Video" Multimedia and Expo, 2005. ICME 2005. IEEE International Conference on Amsterdam, The Netherlands Jul. 6, 2005, Piscataway, NJ, USA,IEEE, Jul. 6, 2005, pp. 1174-1177, XP010843873.

Taiwan Search Report—TW096112157—TIPO—Sep. 22, 2010.

* cited by examiner

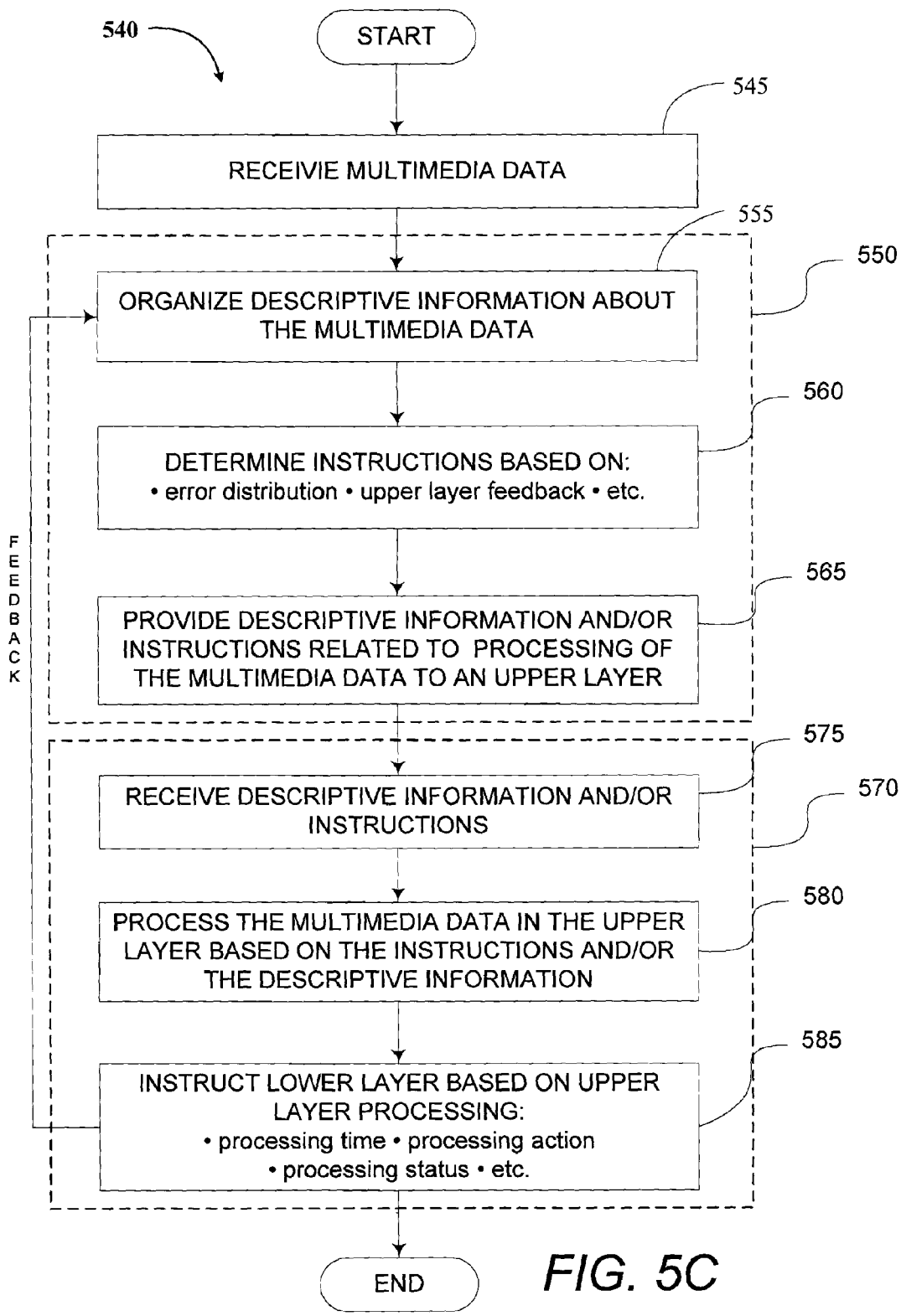

FRAME LEVEL MULTIMEDIA DECODING WITH FRAME INFORMATION TABLE

CROSS-REFERENCE TO RELATED APPLICATIONS

Claim of Priority Under 35 U.S.C. §119

The present Application for Patent claims priority to Provisional Application No. 60/789,443 entitled "FRAME LEVEL VIDEO DECODING WITH FRAME INFORMATION TABLE (FIT)" filed Apr. 4, 2006, and assigned to the assignee hereof and hereby expressly incorporated by reference herein.

BACKGROUND

1. Field of the Disclosure

The disclosure is directed to multimedia signal processing and, more particularly, to video encoding and decoding.

2. Description of the Related Art

Multimedia signal processing systems, such as video encoders, may encode multimedia data using encoding methods based on international standards such as MPEG-x and H.26x standards. Such encoding methods generally are directed towards compressing the multimedia data for transmission and/or storage. Compression is broadly the process of removing redundancy from the data.

A video signal may be described in terms of a sequence of pictures, which include frames (an entire picture), or fields (e.g., an interlaced video signal comprises fields of alternating odd or even lines of a picture). As used herein, the term "frame" refers to a picture, a frame or a field. Frames may be made up of various sized portions of video data including individual pixels, groups of pixels referred to generally as blocks, and groups of blocks generally referred to as slices. Video encoding methods compress video signals by using lossless or lossy compression algorithms to compress each frame. Intra-frame coding (herein referred to as intra-coding) refers to encoding a frame using that frame. Inter-frame coding (herein referred to as inter-coding) refers to encoding a frame based on other, "reference," frames. For example, video signals often exhibit spatial redundancy in which portions of video frame samples near each other in the same frame have at least portions that match or at least approximately match each other. In addition, frames often exhibit temporal redundancy which can be removed using techniques such as motion compensated prediction.

A multimedia bitstream targeted to a single application, such as a video bitstream for example, can be encoded into two or more separate layers (e.g., using scalable coding) such as a base layer and one or more enhancement layers. These layers can then be used to provide scalability, e.g., temporal and/or SNR (signal to noise ratio) scalability. Scalable coding, is useful in dynamic channels, where scalable bitstreams can be adapted to match fluctuations in network bandwidth. In error-prone channels, scalable coding can add robustness through unequal error protection of the base layer and the enhancement layer.

Wireless channels are prone to errors, including bit errors and packet losses. Because video compression inherently removes redundancy, the compressed data becomes critical. Loss of any part of this data during transmission impacts reconstructed video quality at the decoder. The impact is aggravated if the lost data is part of the reference portions for motion compensated prediction and/or spatial prediction, causing temporal and/or spatial error propagation. In addition, scalable coding may also aggravate error propagation. For example, loss of a base layer may render correctly received enhancement layer data useless, if the enhancement layer data depends on the base layer. Also, synchronization may be lost at the decoder due to context dependent coding and predictive coding resulting in even larger portions of lost video that could be displayed if resynchronization were possible. If large portions of video are lost due to errors, error control, detection and recovery may be difficult or impossible for a decoder application. What is needed is a reliable error control system including, at least in part, error detection, resynchronization and/or error recovery that makes maximum use of the received information.

SUMMARY

The system, method, and devices of the disclosure each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Aspects" one will understand how sample features of this disclosure provide advantages to multimedia encoding and decoding that include, for example, improved error concealment, and/or improved efficiency.

A method of processing multimedia data is provided. The method includes receiving the multimedia data, organizing descriptive information about the multimedia data in a first layer, where the descriptive information is related to the processing of the multimedia data in a second layer, and providing instructions related to the processing of the multimedia data in the second layer based at least in part on the descriptive information.

An apparatus for processing multimedia data is provided. The apparatus includes a receiver configured to receive the multimedia data, an information organizer configured to organize descriptive information about the multimedia data in a first layer, where the descriptive information is related to the processing of the multimedia data in a second layer, and an error control decision subsystem configured to provide instructions related to the processing of the multimedia data in the second layer based at least in part on the descriptive information.

A machine readable medium comprising program code is provided. The program code, when executed on one or more machines, causes the one or more machines to perform program operations. The program code includes code for receiving multimedia data, code for organizing descriptive information about the multimedia data in a first layer, wherein the descriptive information is related to the processing of the multimedia data in a second layer, and code for providing instructions related to the processing of the multimedia data in the second layer based at least in part on the descriptive information.

A method of processing multimedia data is provided. The method includes receiving the multimedia data, processing the multimedia data in an upper layer, instructing a lower layer based at least in part on information associated with the processing of the multimedia data in the upper layer, and processing the multimedia data in the lower layer based at least in part on the information associated with the processing of the multimedia data in the upper layer.

An apparatus for processing multimedia data is provided. The apparatus includes a receiver configured to receive the multimedia data, an upper layer decoder subsystem configured to process the multimedia data in an upper layer, and to instruct a lower layer based at least in part on information associated with the processing of the multimedia data in the upper layer, and a lower layer decoder subsystem configured to process the multimedia data in the lower layer based at least in part on the information associated with the processing of the multimedia data in the upper layer.

A machine readable medium comprising program code is provided. The program code, when executed on one or more machines, causes the one or more machines to perform program operations. The program code includes code for receiving multimedia data, code for processing the multimedia data in an upper layer, code for instructing a lower layer based at least in part on information associated with the processing of the multimedia data in the upper layer, and code for processing the multimedia data in the lower layer based at least in part on the information associated with the processing of the multimedia data in the upper layer.

A method of processing multimedia data is provided. The method includes receiving the multimedia data, receiving descriptive information about the multimedia data from a first layer, wherein the descriptive information is related to the processing of the multimedia data in a second layer, and processing the multimedia data in the second layer based at least in part on the received descriptive information.

An apparatus for processing multimedia data is provided. The apparatus includes a receiver configured to receive the multimedia data, a decoder configured to receive descriptive information about the multimedia data from a first layer, wherein the descriptive information is related to the processing of the multimedia data in a second layer, and to process the multimedia data in the second layer based at least in part on the received descriptive information.

A machine readable medium comprising program code is provided. The program code, when executed on one or more machines, causes the one or more machines to perform program operations. The program code includes code for receiving multimedia data, code for receiving descriptive information about the multimedia data from a first layer, wherein the descriptive information is related to the processing of the multimedia data in a second layer, and code for processing the multimedia data in the second layer based at least in part on the received descriptive information.

BRIEF DESCRIPTION OF THE DRAWINGS

FIG. 5C is a flowchart illustrating another example of a method of processing multimedia data in a system such as illustrated in FIG. 1.

DETAILED DESCRIPTION OF CERTAIN ASPECTS

The following detailed description is directed to certain specific sample aspects of the disclosure. Use of the phrases "one aspect," "another aspect," "a further aspect," "an aspect," "some aspects," "certain aspects" and the like are not intended to imply mutual exclusivity of the various aspects of elements within the various aspects. Thus, various aspects and elements of the various aspects may be eliminated and/or combined and still be within the scope of the application. However, the various aspects of the disclosure can be embodied in a multitude of different ways as defined and covered by the claims. In this description, reference is made to the drawings wherein like parts are designated with like numerals throughout.

Aspects include systems and methods of improving processing in an encoder and a decoder in a multimedia transmission system. Multimedia data may include one or more of motion video, audio, still images, or any other suitable type of audio-visual data. Aspects include an apparatus and method of decoding video data to maintain a target video quality using an integrated error control system including error detection, resynchronization and error recovery. Robust error control can be provided by a joint encoder-decoder functionality including multiple error resilience designs. For example, it has been found according to one aspect that error recovery may be an end-to-end integrated multi-layer error detection, resynchronization and recovery mechanism designed to achieve reliable error detection and error localization. It has also been found that benefits in processing performance can be achieved by implementing certain cross-layer interaction during data processing. In another aspect, error handling of a scalable coded bitstream is coordinated across a base-layer and enhancement layer of scalable compressed video.

Figure 1:
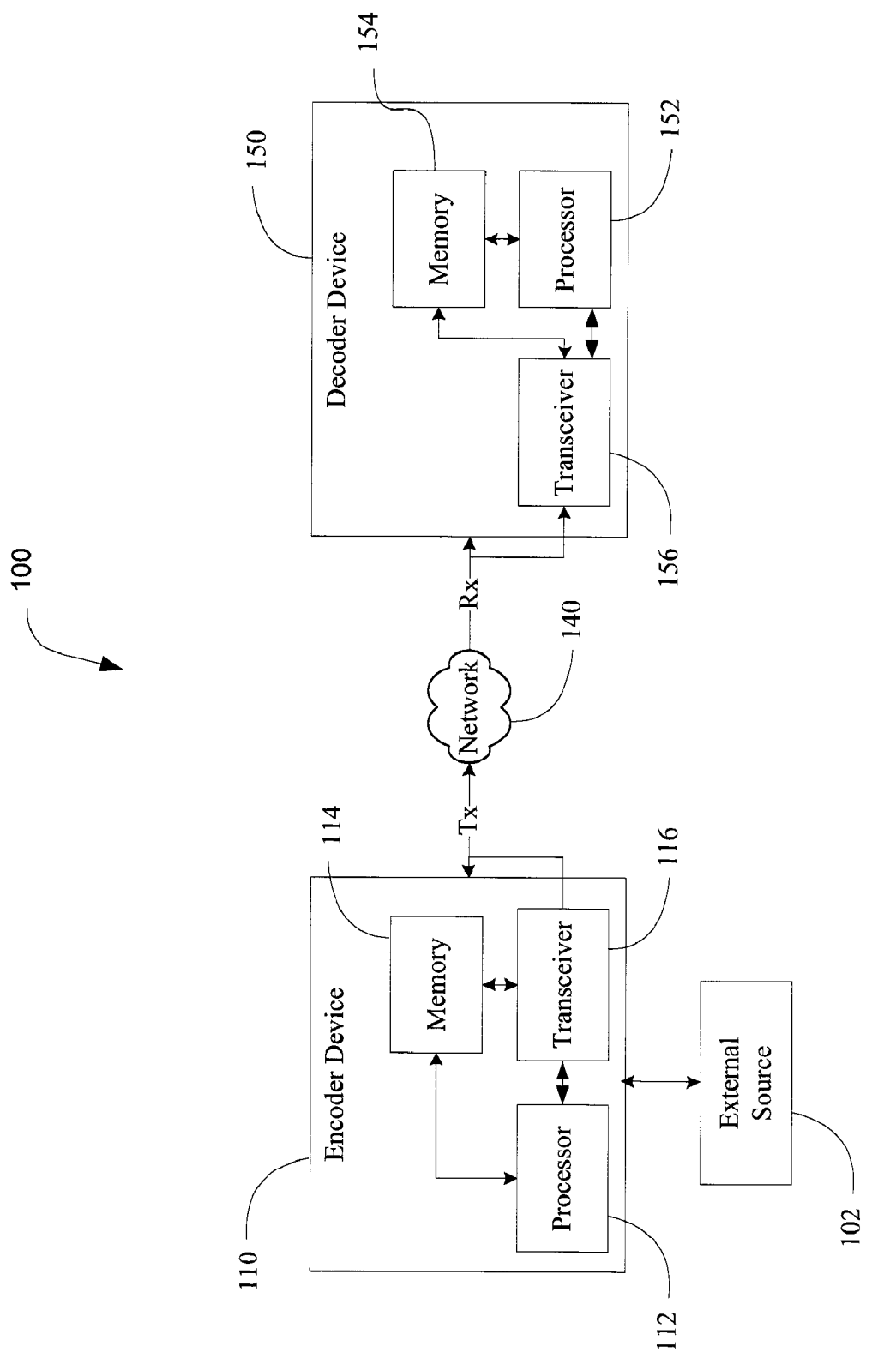
FIG. 1 is a block diagram illustrating a multimedia communications system according to one aspect.

FIG. 1 is a functional block diagram illustrating a multimedia communications system 100 according to one aspect. The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor and/or a digital signal processor and/or an application specific hardware processor. The memory 154 may include one or more of solid state or disk based storage or any readable and writeable random access memory device. The transceiver 156 is configured to receive multimedia data over the network 140 and make it available to the processor 152 for decoding. In one example, the transceiver 156 includes a wireless transceiver. The network 140 may comprise one or more of a wireline or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

Because wireless channels experience both random bit errors and burst errors, error recovery is designed to handle both of these error types effectively. It has been found that by using an integrated multi-layer error control system, both types of error types can be handled effectively. It has been found that random bit errors affecting isolated video portions including, for example, one or several pixels, or even including the loss of a one or more physical layer packets (PLP), may be handled effectively by using spatial or temporal error concealment at the application layer. However, burst errors which result in the loss of multiple consecutive PLPs may be more effectively handled with the help of error control modules embedded in the transport and synchronization layer as discussed below.

Figure 2:
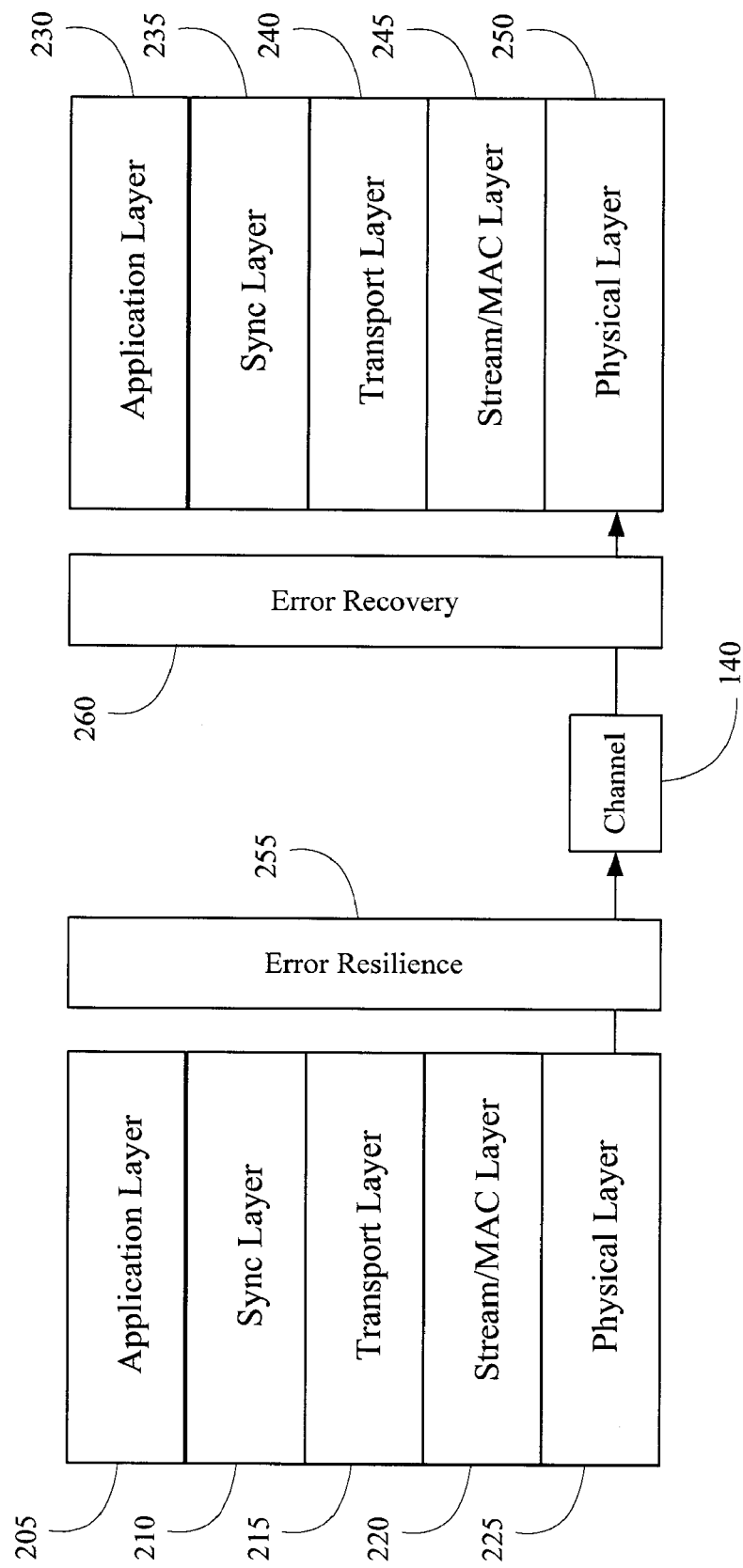
FIG. 2 is a block diagram of an example of a multi-layer protocol stack used for dividing tasks including a cross-layer error control system in the encoder device 105 and the decoder device 110 in the system such as illustrated in FIG. 1.

FIG. 2 is a block diagram of an example of a multi-layer protocol stack used for dividing tasks including a cross-layer error control system in the encoder device 110 and the decoder device 150 in the system such as illustrated in FIG. 1.

Referring to FIGS. 1 and 2, communication devices such as the encoder device 110 and the decoder device 150 may use a multi-layer protocol stack used for distributing processing tasks. Upper layer components in the encoder device 110 and the decoder device 150 may include multiple applications such as, for example video or audio encoders and/or decoders. Some embodiments may include multiple streams of information that are meant to be decoded simultaneously. In these cases, synchronization tasks of the multiple streams may also performed in upper layer components. In the encoder device 110, an upper layer component may provide encoded timing information in the bitstream that is transmitted over a wireless network and/or a wired network 140. In the decoder device 150, an upper layer component may parse the multiple streams of information such that the associated applications decode them at about the same time.

Upper layer components of the encoder device 110 are distributed in one or more of an application layer 205 and a synchronization layer 210. Lower layer components of the encoder device 110 are distributed into one or more of a transport layer 215, a stream and/or medium access control (MAC) layer 220, and a physical layer 225. Similarly, Upper layer components of the decoder device 150 are distributed in one or more of an application layer 230 and a synchronization layer 235. Lower layer components of the decoder device 150 are distributed into one or more of a transport layer 240, a stream and/or medium access control (MAC) layer 245, and a physical layer 350. Skilled technologists will recognize these layers and be familiar with the allocation of various tasks among them. It should be noted that the term upper layer and lower layer as used herein are relative terms. For example, the synchronization layer 235 may be referred to as a lower layer in reference to the application layer 230, but may be referred to as an upper layer in reference to the transport layer 240.

An error resilience system 255 in the encoder device 110 is provided across each of the layers in this example. Lower layer components in the encoder device 110 may include various schemes to provide for error resiliency. Such error resiliency schemes provided in lower layer components may include one or more error control coding schemes, interleaving schemes and other schemes that are known to skilled technologists. Lower layer components in the decoder device 150 may include the corresponding error decoding components that enable detection and correction of errors. Some errors that are introduced over the wired and/or wireless network 150 may not be correctable by the lower layer components of the decoder device 110. For those errors that are not correctable, solutions such as requesting retransmission of corrupt components by lower layer components of the encoder device 105 may not be feasible for some situations.

The upper layer components of the encoder device 150 may attach descriptive information in headers related to various layers of communication, regarding the packetization of multimedia data. In some examples, packetization is performed at various levels to allow multiple streams of data to be split up (parsed) in the encoding process and to be reassembled during decoding using, at least in part, header information that was added by the various layers of the encoder. For example, the synchronization layer 210 may add header information identifying multiple types of packets being linked with multiple decoder components that may decode the multiple types of packets simultaneously. The synchronization layer header information may include fields identifying a data sequence time, a data sequence duration, the destination decoder component (e.g., audio, video and closed caption), frame number, packet number and other information. Synchronization layer packets may be variable length in some examples. This may be due to the various encoding schemes such as, for example, digital compression schemes including variable length coding schemes.

The transport layer 215 may also attach descriptive information to transport layer packets in a transport header. Transport layer packets may be fixed length in order to support various error coding schemes, modulation schemes and other schemes that use fixed length packets. The transport headers may contain information identifying the number of transport layer packets that were parsed from a single synchronization layer packet. If the synchronization layer packet is variable length, then the number of transport layer packets needed to contain the data may be variable as well.

In one aspect, at least some of the information included in the transport and/or synchronization headers may be included in a directory. The directory may include header information related to various layers, such as the application layer 205, the synchronization layer 210, the transport layer 215 and others. The directory may be communicated to the decoder. The information may be used by the decoder device in recovering from various errors including, identifying the size of erroneous packets received in error, identifying the next available packet in order to resynchronize and others. Header information from the header directory can be used to replace the lost or erroneous original header information within the data stream. Further details of the header directory can be found in application Ser. No. 11/527,022, filed on Sep. 25, 2006 and entitled "VIDEO ENCODING METHOD ENABLING HIGHLY EFFICIENT PARTIAL DECODING OF H.264 AND OTHER TRANSFORM CODED INFORMATION" which is assigned to the assignee hereof and fully incorporate herein by reference.

An error recovery system 260 in the encoder device 150 is provided across each of the layers in this example. The decoder device 150 may include various schemes to provide for error recovery. Such error recovery schemes may include lower level error detection and correction components (such as Reed-Solomon coding and/or Turbo-coding) as well as upper layer error recovery and/or error concealment schemes used to replace and/or conceal data not correctable by the lower layer methods. The various error recovery components in the application layer 230 may benefit from the information available to the lower layers such as the synchronization layer 235 and the transport layer 240. The information may be contained in the transport layer headers, the synchronization layer headers, the header directory if one is available, or may be generated at the decoder based on an evaluation of the received data.

As discussed above, the error resilience system 255 in the encoder device 110 and the error recovery system 260 in the decoder device 150 form an end-to-end integrated multi-layer error detection, resynchronization and recovery mechanism which is referred to herein as the error control system. Details of the error control system will now be discussed.

It should be noted that one or more elements of encoder device 110 or the decoder device 150 shown in FIGS. 1 and 2 may be omitted, rearranged, divided and/or combined.

Figure 3A:
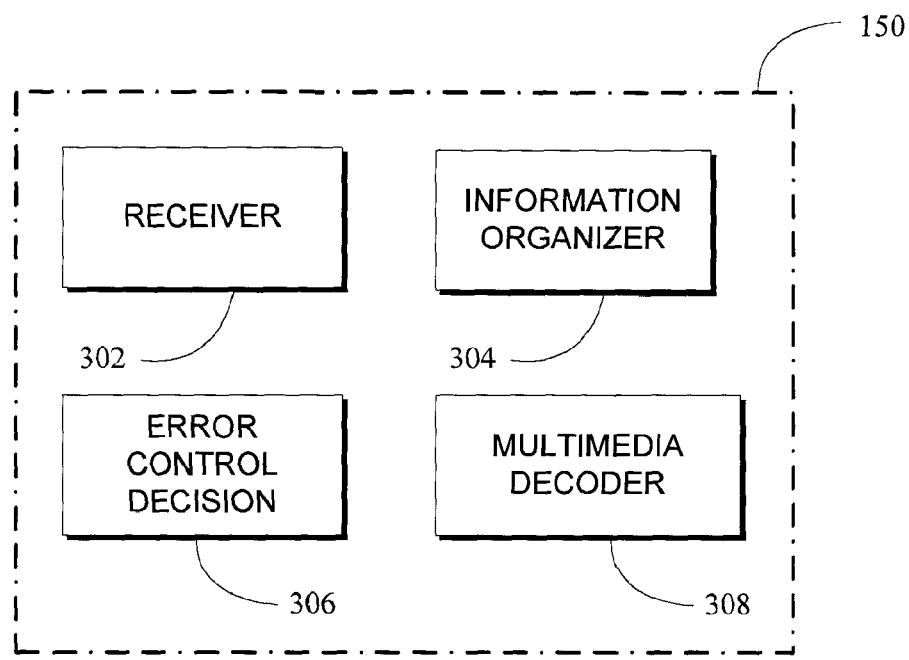
FIG. 3A is a block diagram illustrating an aspect of a decoder device that may be used in a system such as illustrated in FIG. 1.

FIG. 3A is a functional block diagram illustrating an aspect of the decoder device 150 that may be used in a system such as the system 100 illustrated in FIG. 1. In this aspect, the decoder 150 comprises a receiver element 302, an information organizer element 304, an error control decision element 306, and a multimedia decoder element 308.

The receiver 302 receives encoded video data (e.g., data encoded by the encoder 110 of FIG. 1). The receiver 302 may receive the encoded data over a wireline or wireless network such as the network 140 of FIG. 1. In one aspect, the received data includes transform coefficients representing source multimedia data. The transform coefficients are transformed into a domain where the correlations of neighboring samples are significantly reduced. For example, images typically exhibit a high degree of spatial correlation in the spatial domain. On the other hand, the transformed coefficients are typically orthogonal to each other, exhibiting zero correlation. Some examples of transforms that can be used for multimedia data include, but are not limited to, the DCT (Discrete Cosine Transform), the DFT (Discrete Fourier Transform), the Hadamard (or Walsh-Hadamard) transform, discrete wavelet transforms, the DST (Discrete Sine Transform), the Haar transform, the Slant transform, the KL (Karhunen-Loeve) transform and integer transforms such as one used in H.264. The transforms are used to transform a matrix or array of multimedia samples. Two dimensional matrices are commonly used, but one dimensional arrays may also be used.

The received data also includes information indicating how the encoded blocks were encoded. Such information may include inter-coding reference information such as motion vectors and frame sequence numbers, and intra-coding reference information including block sizes, and spatial prediction directivity indicators, and others. Some received data includes quantization parameters indicating how each transform coefficient was approximated by a certain number of bits, non-zero indicators indicating how many transform coefficients in the transformed matrix are non-zero, and others.

The information organizer element 304 gathers descriptive information about the multimedia data from the bitstream. In one aspect, the information organizer 304 interprets the transport and sync layer header data for further processing. The transport headers may be processed to determine frame and superframe boundaries, where a super frame is a group of frames that typically are independently decodable. A superframe may include frames that cover a fixed time period ranging from about 0.2 seconds to about 2.0 seconds. Superframe size may be chosen to allow for a reasonable acquisition time. Transport headers may also be processed to determine frame lengths and byte offsets of frames into the bitstream, to handle erroneous PLPs received from the Stream/MAC layer. The sync layer headers may be processed to extract frame numbers and interpret base and enhancement frames, to extract frame rate required to interpolate presentation time stamps in case of errors and/or to interpolate and derive PTSs for frames interpolated through the process of Frame Rate Up Conversion (FRUC). The sync headers may also be processed to extract presentation time stamps for the video frames to synchronize with the associated audio frames, and to extract random access point locations to mark the next resynchronization point in case of errors that result in loss of synchronization in the decoder. The information organizer 304 may also gather information from a header directory as discussed above, if one is available.

In addition to gathering information from headers and header directories, the information organizer 304 may also generate descriptive information about the video data. The various header checksums, payload checksums, and error control schemes may all be used to identify which portion of data are erroneous. The generated information may include data identifying these erroneous portions of data. The error data may be an error distribution measure or a error rate measure. The error data may be organized on any level from a frame level, to a slice level (a slice is a group of encoded blocks of pixels), pixel block level or even a pixel level. These types of descriptive information regarding erroneous data may be used to localize and establish the extent of the errors. The details of types of information that may be identified, compiled, gathered, maintained, flagged or generated by the information organizer 304 will be discussed below.

In one aspect, the error control decision element 306 uses the descriptive information (e.g., stored in table form) gathered and/or generated by the information organizer 304 to provide instructions related to the processing of the multimedia data. The error control decision element 306 analyzes the descriptive information in order to localize the errors and establish which portions of video are affected and to what extent these portions are erroneous. Using this information, the error control decision element 306 can determine an error control method for handling the error conditions. In another aspect, the error control decision element 306 receives feedback information from the upper layers. The feedback information may include information associated with processing of the multimedia in the upper layer. The feedback information may include information that was incorrect in the descriptive information passed up to the upper layer. This information may be used to correct the table stored in the lower layer. In addition, the feedback information may include processing times, processing actions, processing status and other information. This type of information may be analyzed by the error control decision element 306 in determining how to instruct the upper layer.

The error control decision element 306 analyzes the information that it has gathered in order to make a decision on how the upper layer should process the multimedia data when it is forwarded to the upper layer. The decision may include choosing one or more of several error control methods. Error control methods may include spatial and/or temporal error concealment of portions of video data that are erroneous. Error control methods may also include error recovery techniques where the erroneous data is analyzed to be salvaged in some way based on context or other information available to the upper layer application. An extreme form of temporal error concealment that may be used is known as frame rate up conversion, or FRUC. FRUC constructs a new frame based on other frames, usually two frames that straddle the frame to be constructed. When erroneous portions of data are at a manageable level, (e.g., portions of a frame, a single frame, or a number of frames determined to be concealable depending on the situation), the error control decision element 306 may instruct the upper layer to use spatial and/or temporal error concealment, error recovery or FRUC, as well as other error control schemes. However, if the extent of the erroneous data is too extensive, the error control element may instruct the upper layer to skip decoding of the erroneous portions. The details used by the error control decision element 306 in determining how to instruct the upper layer are discussed below.

The multimedia decoder element 308 performs the functions related to decoding of the multimedia bitstreams that may include audio, video closed caption and more. The multimedia decoder performs inverse operation corresponding to the encoding operations used to encode the data. The encoded data may be inter-coded (e.g., temporally predicted data) and/or intra-coded data. In reference to FIG. 2, the functions performed by the multimedia decoder 308 may be performed at multiple levels such as the transport layer 240, the sync layer 235 and the application layer 250. Transport layer functions may include the error detection and correction schemes used to correct error and to identify uncorrectable errors. The identified uncorrectable errors may be communicated to the information organizer 304 for inclusion in the descriptive information as discussed above. The sync layer functions may include buffering the received data of the multiple bitstreams until all synchronized data is ready to be decoded. At which point it is forwarded to the application layer decoders for near simultaneous decoding. The application layer functions may include decompression of the audio, video and closed caption bitstreams. Various decompression functions may include dequantization, and inverse transformations used for reconstruction of the video data. In one aspect, the application layer of the video decoder element 308 receives video frames one frame at a time in decode order after the information organizer 304 and the error control decision element 306 have performed the functions discussed above.

In some aspects, one or more of the elements of the decoder 150 of FIG. 3A may be omitted, rearranged and/or combined. The elements may be implemented by hardware, software, firmware, middleware, microcode or any combination thereof. Details of the actions performed by the elements of the decoder 150 will be discussed in reference to the methods illustrated in FIGS. 5A-5C below.

Figure 3B:
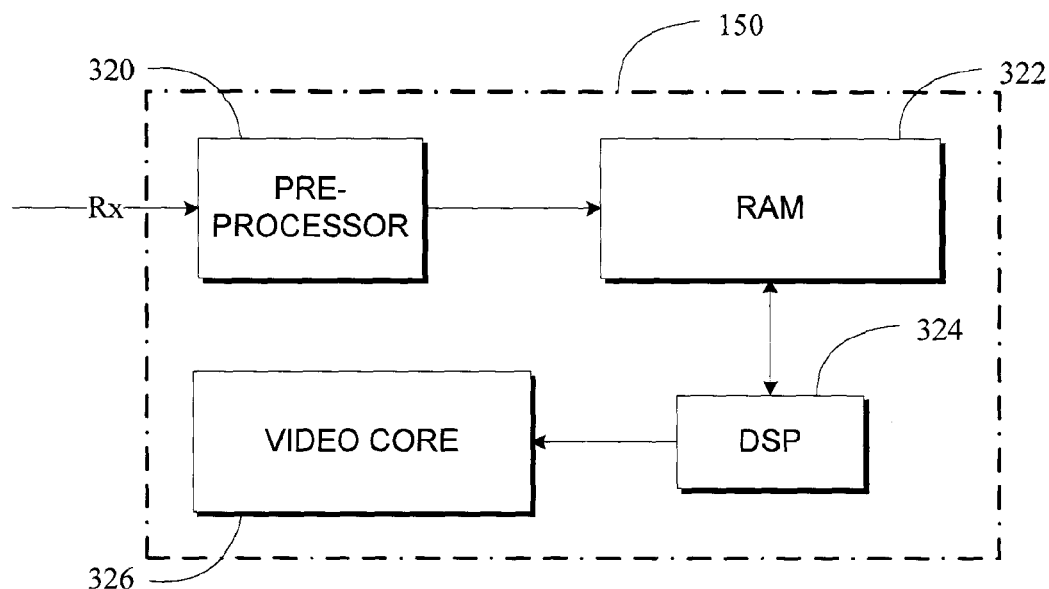
FIG. 3B is a block diagram illustrating an example of a computer processor system of a decoder device that may be used in a system such as illustrated in FIG. 1.

FIG. 3B is a block diagram illustrating an example of a computer processor system of a decoder device that may be used in a system such as illustrated in FIG. 1. The decoder device 150 of this example includes a pre-processor element 320, a random access memory (RAM) element 322, a digital signal processor (DSP) element 324, and a video core element 326.

The pre-processor 320 is used in one aspect to perform one or more of the actions performed by the various elements in FIG. 3A. The pre-processor parses the video bitstream and writes the data to the RAM 322. In addition, in one aspect, the pre-processor 320 implements the actions of the information organizer 234, the error control decision element 306 and pre-processing portions (e.g., error concealment, error recovery, etc.) of the multimedia decoder 308. By performing these more efficient, less computationally intensive actions in the pre-processor 320, the more computationally intensive video decoding can be done, in causal order, in the highly efficient video core 326.

The DSP 324 retrieves the parsed video data stored in the RAM 322 and reorganizes it to be handled by the video core 326. The video core 326 performs the dequantization (also known as rescaling or scaling), inverse transforming and deblocking functions as well as other video decompression functions. The video core is typically implemented in a highly optimized and pipelined fashion. Because of this, the video data can be decoded in the fastest manner when it is decoded in causal order. By performing the out-of-order parsing, error detection, information organization and error control in the pre-processor, the causal order is maintained for decoding in the video core allowing for improved overall decoding performance.

Figure 4:
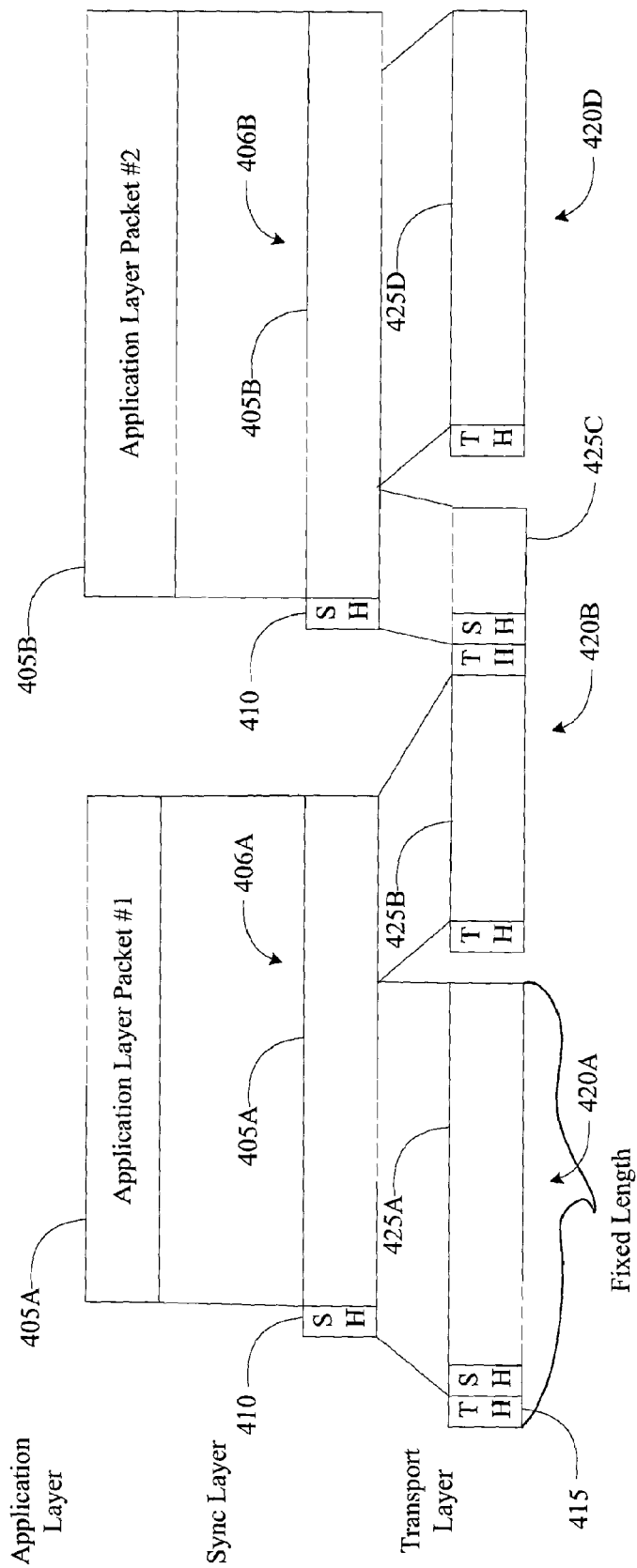
FIG. 4 shows an illustration of an example of a multiple layer packetization scheme.

As discussed above, the information organizer element 304 may gather descriptive information, organize it into a table and forward the table to upper layers for purposes of error control. One source of descriptive information is the various headers appended to the packets of the various packetization layers. FIG. 4 shows an illustration of an example of a multiple layer packetization scheme. This example packetization scheme is used to explain certain aspects of the error control system, but other packetization schemes can also be used. The transport layer and sync layers are a framing and checksum protocol. They provide a layered mechanism to detect errors at various layers including, for example, at a super frame (a selected number of processed frames) level, at a video access unit (VAU) level, or at a PLP level. Thus, effective error localization can be performed at any or all of these levels. The VAU comprising a single video frame, provides an additional level of integrity check at the application layer above the sync layer packet.

In this example, application layer packets 405A and 405B may be fixed and/or variable length packets. The application layer packets 405A and 405B may each be a complete video frame or VAU. A synchronization layer appends a synchronization layer header (SH) 410 to each application layer packet 405A and 405B, resulting in sync layer packets 406A and 406B (the sync layer packets 406A and 406B in FIG. 4 include a sync layer header 410 and the application layer packets 405A and 405B, respectively). The sync layer packets 406A and 406B are then input to the transport layer. In this example, the transport layer packets are fixed length. The transport layer breaks down the sync layer packets into portions corresponding to the transport layer packet size and appends transport layer headers (TH) 415 to the resulting transport layer packets. The transport layer may also append a frame checksum (FCS) to each sync layer packets (not shown). The FCS may be used to detect errors in the sync layer packets. In this example, the sync layer packet 406A comprising the application layer packet 405A is split into two transport layer packets 420A and 420B, where packet 420B includes the remaining portion 425B of the sync layer packet 406A and a first portion 425C of the sync layer packet 406B. In this example, an additional transport layer header 415 is appended to the portion 425C of the transport layer packet 420B, preceding the start of the next sync layer packet 406B. A third transport layer packet 420D contains the next portion 425D of the sync layer packet 406B.

The sync layer headers 410 and the transport layer headers 415 may contain similar information directed to enable a decoder to reassemble the synchronization layer packets and application layer packets. A header may include information such as a packet size, a packet number, a location of a header within a packet, a data sequence time, a data sequence duration, a frame time, a frame number, a random access point flag, a frame rate and/or a number of associated packets in a group. In addition, header information may include stream identification information identifying the associated packet as belonging to a video bitstream, an audio bitstream, and/or a closed caption bitstream. A specific example of transport and sync layer headers will now be discussed.

One function of the transport layer is to provide a packet service over the octet-based service of the stream/MAC layer. The transport layer also provides mechanisms to determine boundaries of its payload packets (VAUs in the example shown in FIG. 4) in the presence of physical layer errors. Multiple framing protocols may be used in association with the transport layer. The framing protocol associated with the transport layer specifies rules for combining its payload packets to create packets to be delivered to the decoder in the application layer. The framing protocol also specifies rules for handling PLP errors and the resulting behavior that can be expected by the decoder.

An example format of certain fields in the transport layer header 415 is given in Table 1. In this example, the framing protocol rules provide for a 122 byte fixed length PLP. In addition to indicating the start and end of the payload (the VAU in this example), the transport header is also used to convey erroneous PLPs to upper layers.

TABLE 1

| Field | Type | Range |
| --- | --- | --- |
| LENGTH | UNIT(7) | 0-121 |
| LAST | BIT(1) | 0/1 |

The transport header in Table 1 is one-byte long. The seven bit LENGTH field indicates the length of the payload in bytes and has a range from 0 to 121 bytes (the maximum value is 121 since the PLP is 122 bytes long and the header is one-byte). The LAST field being set to one indicates that this transport layer packet contains the last fragment of a VAU. In this example, if the PLP is determined to be erroneous (as determined by one or more of the checksums and/or error correction schemes), the transport layer sets the value of the LENGTH field to 122, marking the whole PLP as unusable to the upper layers which it is forwarded to.

An example format of certain fields in the synchronization layer header 410 is given in Table 2. Sync layer packets form the payload for the transport layer for video. In one example, a frame of video forms a sync layer packet. In the example shown in Table 2, the sync layer packet header 410 is a fixed 4-byte header and the corresponding sync layer packet is a variable length payload corresponding to one video frame. Information included in the sync header fields of Table 2 may include information such as video frame type, frame rate, presentation time stamp, random access flag, frame number within a Super frame, and whether the data is associated with a base or enhancement layer bitstream, and others.

TABLE 2

| Field Name | Field Type | Description |
| --- | --- | --- |
| Stream_ID | UNIT(2) | 00 - Video; 01 - Audio; 10 - Closed Caption |
| PTS | UINT(14) | Presentation Time Stamp |
| Frame_ID | FRAME_ID_TYPE(7) | Frame_Number and Enhancement_Flag |
| | | Frame_Number: Number of the current frame within the SF |
| | | Enh. Flag: 0 - Base; |
| | | 1 - Enhancement layer |
| RAP_FLAG | BIT(1) | Random Access Point |
| | | 1 - RAP |
| FRAME_RATE | UINT(3) | 000 - 15 fps, 001 - 30 fps, etc. |
| RESERVED | UINT(5) | Reserved bits |

The Stream_ID field is used to indicate one of a plurality of multimedia streams that the payload data is associated with (e.g., audio, video, closed caption data, etc.). The PTS field is used to indicate the presentation time which can be used to synchronize the audio, video, etc. The Frame_ID field includes a cyclical frame number (e.g., 7 bits representing frames 0-127) portion and an enhancement bit indicating whether the data is base layer or enhancement layer data. If scalable coding is not used, the enhancement bit may be omitted. The RAP_FLAG field is used to indicate whether a frame can be used by a decoding device as a random access point. A random access point can be decoded without reference to any other previous or future frames or other portions of video. The FRAME_RATE field indicates one of a plurality of possible frame rates. Frame rates may range from about 15 frames per second or lower to about 60 frames per second or higher. The RESERVED field may be used to communicate other types of information that skilled technologists may find beneficial.

In addition to the transport header information and sync header information, another source of descriptive information for the information organizing element may be a header directory, as discussed above. The header directory is a table of duplicated header information that is transmitted as side information, in one example, separate from the video and/or audio bitstreams. The header directory information such as listed in Table 3.

TABLE 3

| Field Name | Field Type | Field Value |
|---|---|---|
| MESSAGE_ID | UINT(8) | 5: video Sync directory |
| MEDIA_TYPE | UINT(2) | 0: video sync directory message |
| NUM_VSL_RECORDS | UINT(1) | 0: 1 VSL_records; 1: 2 VSL_records |
| VSL_RECORDs | VSL_RECORD_TYPE | VSL_record contains, 1. Frame rate 2. Number of frames 3. 1st Frame PTS 4. Last frame PTS |
| RAP_FLAG_BITS | BIT(60) | RAP frame location bit map in the SF |
| B_FRAME_FLAG_BITS | BIT(60) | B frame location bit map in the SF |
| RESERVED | BIT(3) | TBD |

The header directory can be transmitted as a variable length payload. Much of the information is a duplication of the information in the various headers of the packetization scheme (e.g., frame rate, presentation time stamps, random access points). However, additional information may be included. Such additional information may include the B_FRAME_FLAG_BITS field, which indicates the location of the B-frames within a superframe. A superframe typically starts with an independently decodable frame such as an intra-coded frame. The other frames in the superframe typically comprise uni-directionally predicted portions (referred to herein as P-Frame portions or simply P-Frames) and bi-directionally predicted portions (referred to herein as B-Frame portions or simply B-Frames). In the example of Table 3, the random access points in the superframe are mapped into the RAP_FLAG_BITS field.

The header directory provides header information and additional information concerning the position of certain frames (e.g., B-Frames) within a superframe. This information can be used to replace the lost header information (lost due to errors) as well as enabling the information organizer element 304 to determine the likely identity of erroneous portions of data that otherwise could not be identified.

Figure 5A:
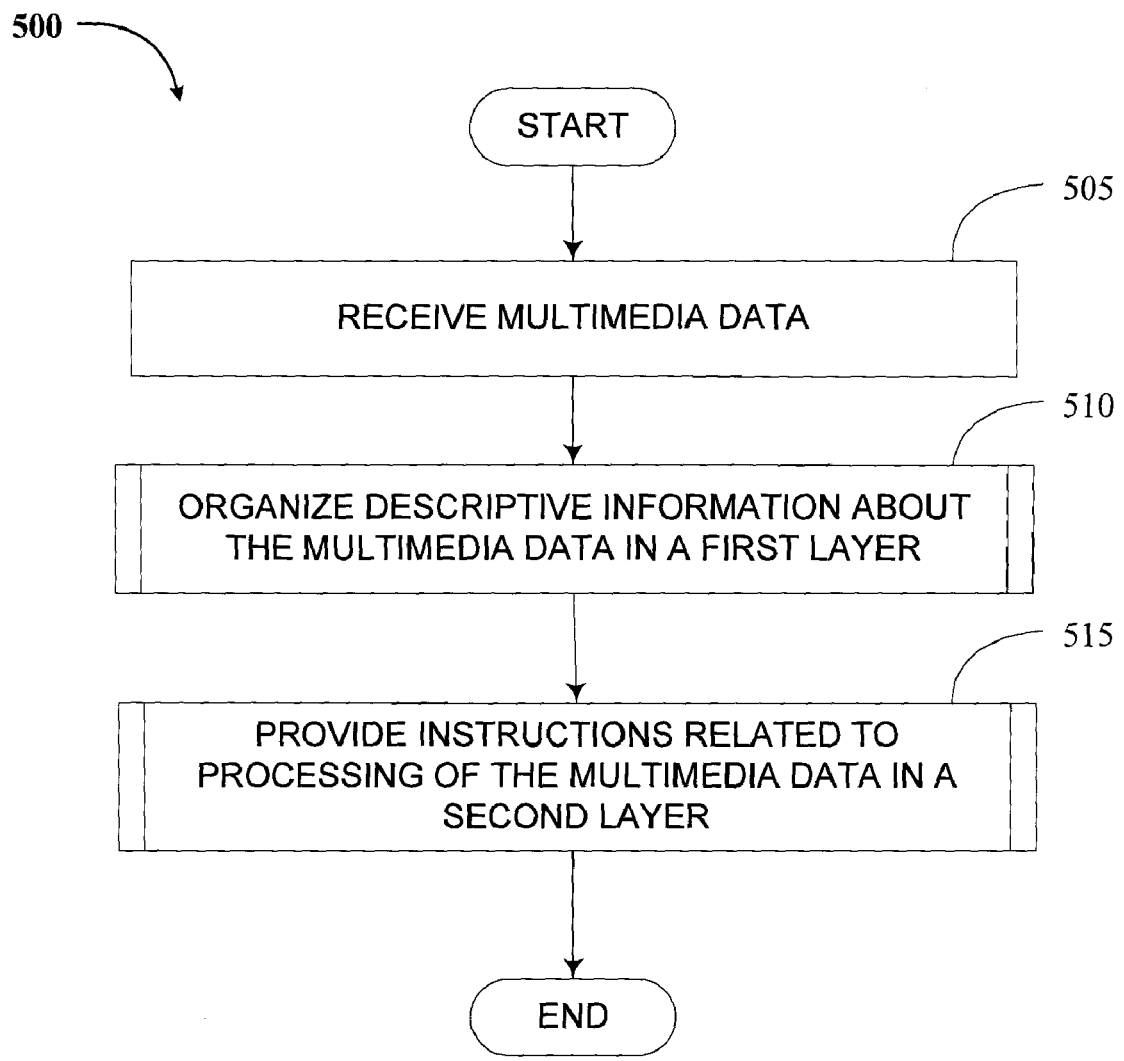
FIG. 5A is a flowchart illustrating an example of a method of processing multimedia data in a system such as illustrated in FIG. 1.

FIG. 5A is a flowchart illustrating an example of a method of processing multimedia data in a system such as illustrated in FIG. 1. Process 500 starts at block 505 where the decoder device receives encoded multimedia data. The encoded multimedia data may be in the form of compressed data associated with a multimedia data bitstream. The decoder device may receive the multimedia data over a wireline and/or wireless network such as the network 140 shown in FIG. 1. The multimedia data may comprise multiple synchronized and/or non-synchronized bitstreams including, but not limited to audio, video, closed caption and the like. The multimedia data may comprise multiple packetized layers including application layer packets, sync layer packets and transport layer packets. The multiple layers may each include header information as discussed above. The header information may include information such as listed in Tables 1 and 2 above. The video data may be arranged in portions such as frames, slices, blocks of pixels, etc. The frames may be grouped into superframes of multiple frames. The received multimedia data may also include a header directory as discussed above. The received multimedia data may be encoded in scalable layers such as a base layer and an enhancement layer. The header directory may contain information such as listed in Table 3. The receiver element 302 of the decoder device 150 in FIG. 3A may perform the functions at block 505.

After receiving the multimedia data at the block 505, the process 500 continues to block 510 where the decoder device organizes descriptive information about the received multimedia data. As discussed above in reference to FIG. 3A, the information organizer element 304 gathers descriptive information about the multimedia data from the bitstream at block 505. The transport headers may be processed to determine frame and superframe boundaries. Transport headers may also be processed to determine frame lengths and byte offsets of frames into the bitstream. The sync layer headers may be processed to extract frame numbers and interpret base and enhancement frames (e.g., for scalably coded bitstreams), to extract frame rates, and/or to interpolate and derive PTSs for frames. The sync headers may also be processed to extract presentation time stamps or to extract random access points. The information identified, compiled, gathered, maintained, flagged or generated at the block 510 may also be obtained from a header directory as discussed above, if one is received at the block 505.

The descriptive information organized at block 510 may also include information pertaining to erroneous data. The error data may include an error distribution measure or an error rate measure. The error data may be organized on any level from a frame level, to a slice level (a slice is a group of encoded blocks of pixels), pixel block level or even a pixel level. These types of descriptive information regarding erroneous data may be used to localize and establish the extent of the errors. An example of a table of descriptive information that may be organized at the block 510 is now discussed.

Table 4 lists an example of a frame information table that may be generated at the block 510. Similar tables may also be organized at other levels such as slices, blocks of pixels, etc.

TABLE 4

| Frame No. | Layer | Frame Length | PTS | Frame Type | RAP FLAG | PLP error distribution | PLP error ratio | Action |
|---|---|---|---|---|---|---|---|---|
| 1 | base | L1 | PTS1 | I | 1 | Error_dist_1 | 15% | TBD |
| 2 | base | L2 | PTS2 | P | 0 | Error_dist_2 | 10% | TBD |
| 3 | base | L3 | PTS3 | P | 0 | Error_dist_3 | 0% | TBD |
| 4 | base | L4 | PTS4 | P | 0 | Error_dist_4 | 40% | TBD |

The frame no., layer (e.g., base or enhancement), frame length, PTS, frame type, RAP_FLAG fields may be obtained from the sync layer headers that are known to be non-erroneous. These fields may also be obtained from a header directory if one is received at the block 505. If several erroneous frames are concatenated together (e.g., due to corruption of the sync header), the frame length field may be set to a value equal to the total number of bytes of the concatenated frames. The frame type field may be used to indicate an I-frame, a P-frame or a B-frame, for example. Some of these fields may not be able to be filled in due to corruption of the data.

The PLP error distribution field is used to provide descriptive information related to the position of the erroneous data within the detected frame. Each frame may be made up of several PLPs as discussed above in reference to FIG. 4. The "Error_dist_n" variable contains an indication of which portion of PLPs contain erroneous data. Several method of indicating error distribution may be used. For example, the error distribution may be rounded up to a ¹⁄₁₆th portion of a frame and represented by a two-byte "Error_dist_n" variable. Each bin or bit of the two-byte variable indicates the presence of erroneous PLPs for a ¹⁄₁₆th portion of the frame. A value of 1 indicates that there are erroneous PLPs for that range, and a 0 indicates an error free PLP portion. If several frames are concatenated together, the PLP error distribution captures the total error distribution of all the PLPs within the concatenated frames. At this point in the process 500, the final field of the frame information table listed in Table 4, "Action", is not completed and may be determined at block 515 based on the other information contained in the frame information table. The frame information table may be stored into the memory element 154 of the decoder device 150 in FIG. 1. The information organizer 304 of the decoder device 150 of FIG. 3A may perform the functions at the block 510.

After organizing the descriptive information at the block 510, the process 500 continues to block 515 where the decoder device provides instructions related to processing of the multimedia data in a second layer. The second layer may be an upper layer or a lower layer. The examples discussed above have related to a lower layer (e.g., the transport and/or sync layer) providing instructions to an upper layer (e.g., the application layer). However methods discussed below will show that upper layers may also provide instructions to lower layers based on descriptive information obtained in the upper layers.

In one aspect, the decoder device provides instructions related to a method of error control to be performed in another layer (e.g., an application layer). Methods of error control may include various error recovery techniques. In error recovery techniques attempts are made to salvage values of variables contained in the erroneous data. These methods may include using the header directory discussed above, if one is received at the block 505, to identify the size of the frame payload of the sequence layer packets. The header directory may contain information identifying the type of encoding, the number and size of transport layer packets, timing information, etc.

Another form of error control that may be performed is error concealment. Error concealment techniques generally involve estimating pixel values from other already received and/or decoded pixel values. Error concealment techniques may use temporal and/or spatial concealment. For example, if a portion of a P-frame is erroneous, the error concealment may be chosen to be temporal concealment based on a previous frame that is already decoded. If a portion of a B-frame is erroneous, temporal prediction from two other received and/or decoded frames may be used.

Another form of error control that may be performed is FRUC. In FRUC techniques, an entire frame is constructed based on one or more other frames. FRUC techniques can use temporal concealment techniques similar to those used for portions of a frame, but are simply performed over the entire frame.

In one aspect, the error control decision element 306 of the decoder device 150 of FIG. 3A performs the actions at the block 515. The error control decision element 306 uses the error distribution characteristics that were organized at the block 310 to determine which of the various error control techniques to recommend be performed. Details of methods for determining which error control technique to recommend are discussed below. In some cases, the error control decision element 306 may determine that no error control technique is feasible and may recommend skipping error control for one or more frames. In this case, the last frame that was successfully decoded may be displayed instead. In one aspect, the method of error control that is determined at the block 515 is stored in the "Action" field of the frame information table as shown in Table 3. The frame information table is passed to the layer where the error control methods are performed. The video decoder takes the corresponding frame's "Action" item from the frame information table and uses it as a starting point to guide the decoding process. It should be noted that some of the blocks of the process 500 may be combined, omitted, rearranged or any combination thereof.

Figure 5B:
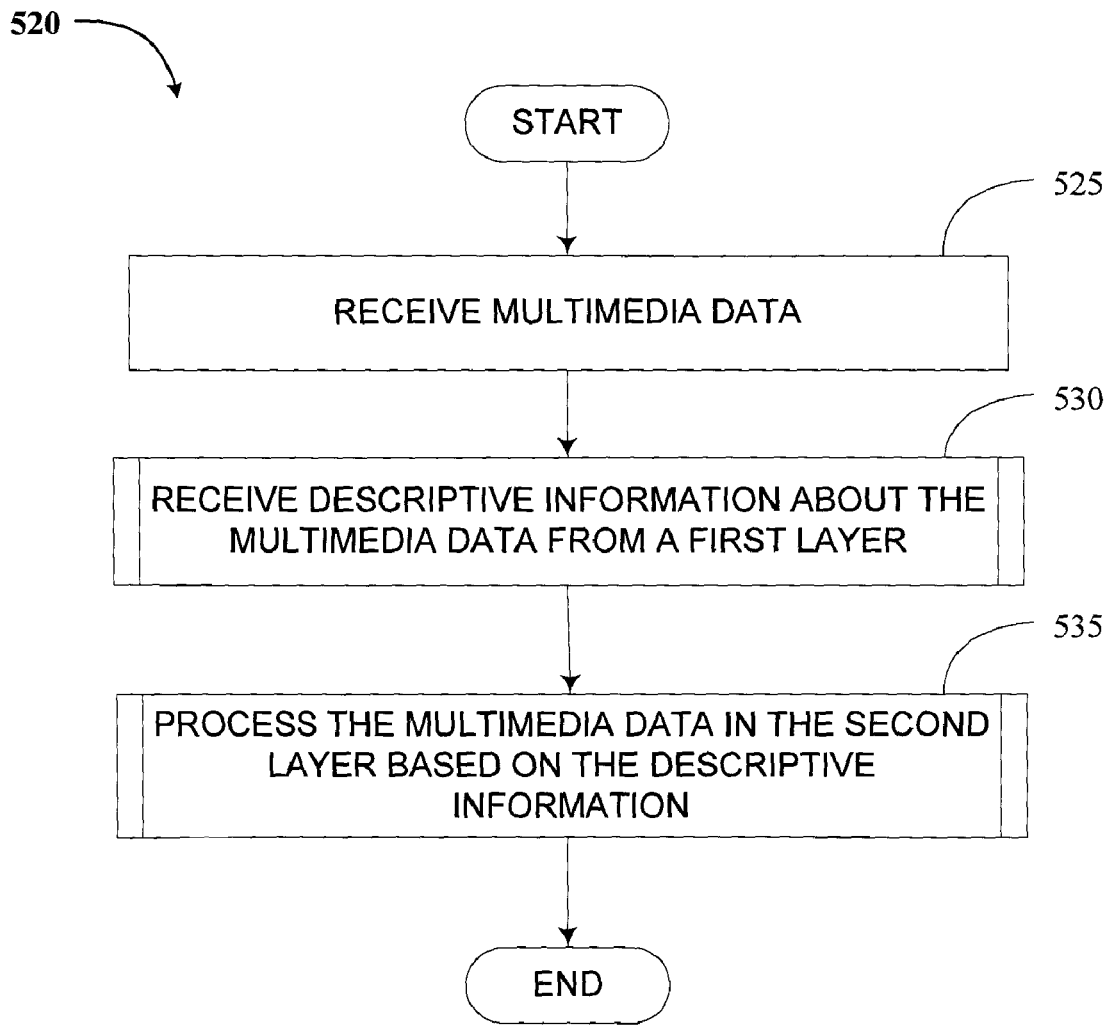
FIG. 5B is a flowchart illustrating another example of a method of processing multimedia data in a system such as illustrated in FIG. 1.

FIG. 5B is a flowchart illustrating another example of a method 520 of processing multimedia data in a system such as illustrated in FIG. 1. The method 520 may be performed in an application layer of a decoder device that has a lower layer that performs the method 500 of FIG. 5A in a lower layer.

The method 520 starts at block 525 where multimedia data is received at the layer performing the method 520. The multimedia data may be portions of multimedia data such as frames, slices or blocks of pixels. In one aspect, the portions of multimedia data received at the block 525 have been compiled at a lower level such as a transport and/or sync layer combining transport layer packets to form a complete sync layer packet. The complete sync layer packet may be a complete frame or some other portion of video that can be decoded. In some aspects, the portions of multimedia data received at the block 525 are received in the order in which they can be displayed in the multimedia sequence. The multimedia decoder subsystem 308 of the decoder device 150 shown in FIG. 1 can perform the acts at the block 525.

After receiving the multimedia data at the block 525, the decoder layer performing the process 520 receives descriptive information about the multimedia data from a first layer at block 530. The first layer may be a lower layer (e.g., the transport or sync layer). The descriptive information received at block 530 may be identified, compiled, gathered, maintained, flagged or generated at the block 510 of the process 500 discussed above. The descriptive information received at the block 530 may be in the form of a frame information table including entries such as those shown in Tables 3 or 4 above. The frame information table may include a recommended "Action" related to processing the multimedia data. The multimedia decoder subsystem 308 of the decoder device 150 shown in FIG. 1 can perform the acts at the block 530.

After receiving the multimedia data at the block 525 and the descriptive information about the multimedia data at the block 530, the process 520 continues at block 535 where the second layer processes the received multimedia data based at least in part on the received descriptive information. If the descriptive information contains a recommended "Action", the decoder subsystem performing the process 520 may or may not use the recommended action. As discussed above, the recommended action may comprise one or more error control techniques including, but not limited to, error recovery techniques, error concealment techniques or skipping decoding. The decoder device may or may not follow the recommended action depending on what data may be recovered during error recovery. For example, the lower layer process that organized the descriptive information received at the block 530 may not have been able to identify how many frames were in a section of erroneous data. The upper layer error recovery techniques may be able to identify the number of frames in the section of erroneous data and may choose to perform some error recovery or concealment techniques that were not recommended in the "Action" field of the frame information table. The multimedia decoder subsystem 308 of the decoder device 150 shown in FIG. 1 can perform the acts at the block 535. It should be noted that some of the blocks of the process 520 may be combined, omitted, rearranged or any combination thereof.

FIG. 5C is a flowchart illustrating another example of a method 540 of processing multimedia data in a system such as illustrated in FIG. 1. The method 540 starts at block 545 where the decoder device receives encoded multimedia data. The actions performed at the block 545 may be similar to those performed at the block 505 of the process 500 illustrated in FIG. 5A. The receiver element 302 of the decoder device 150 in FIG. 3A may perform the functions at block 545.

The remaining actions of the process 540 include actions 550 performed at a lower layer and actions 570 performed at an upper layer. The lower layer actions 550 include certain actions that may be similar to some of the actions performed in the process 500 illustrated in FIG. 5A. Likewise, the upper layer actions 570 include certain actions that may be similar to some actions performed in the process 520 illustrated in FIG. 5B.

Figure 6:
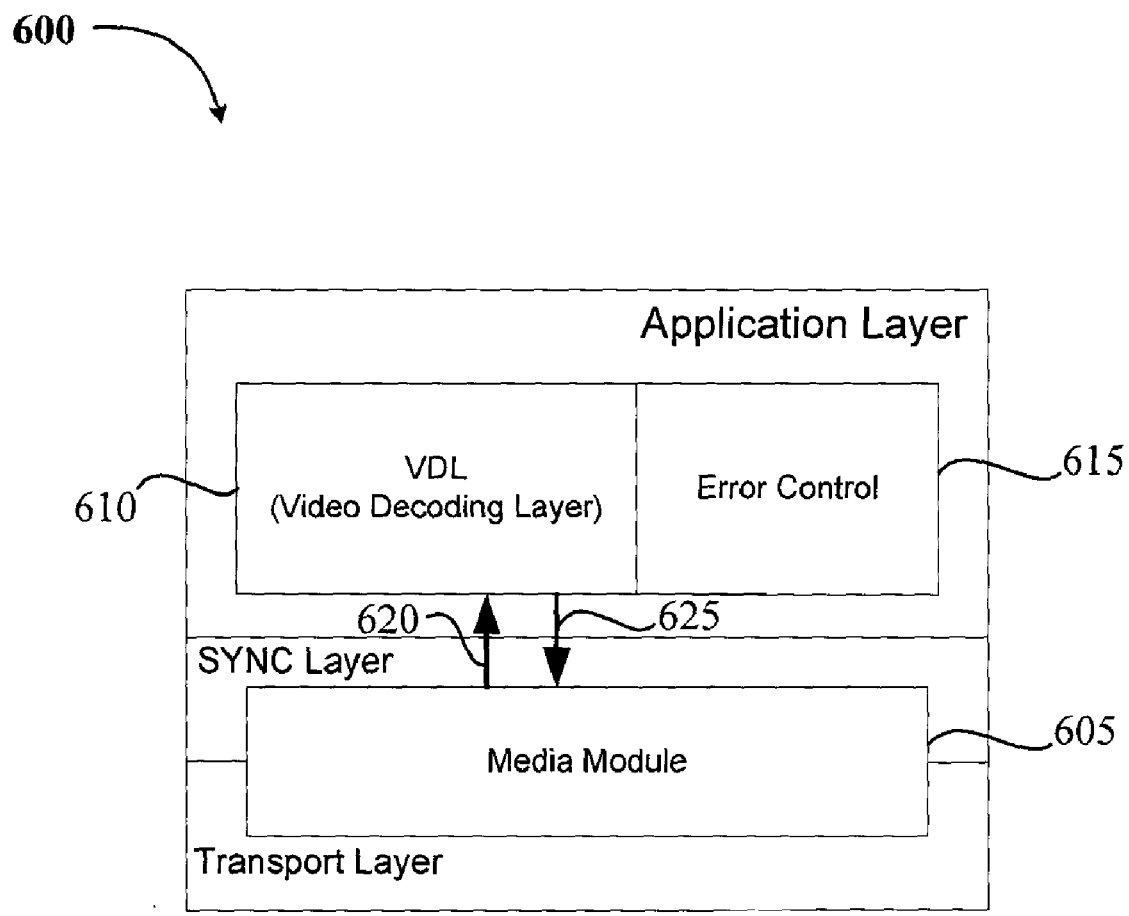
FIG. 6 is a block diagram of an example of a multilayer multimedia decoder subsystem that may be used to perform the method illustrated in FIG. 5C.

The method 540 illustrated in FIG. 5C may be performed by a multilayer multimedia decoder subsystem such as the one shown in FIG. 6. In one aspect, a multimedia decoder 600 comprises a lower layer media module subsystem 605 in the transport layer and sync layer. The multimedia decoder 600 also includes an upper layer subsystem located in the application layer. The media module subsystem 605 may include the information organizer 304 and the error control decision subsystem 306 illustrated in FIG. 3A. The application layer includes a multimedia decoder including a video decoding layer (VDL) 610 and an error control subsystem 615. The lower layer media module provides descriptive information and/or instructions to the upper layer as indicated by the up-arrow 620. The upper layer subsystems 610 and 615 may provide feedback to the lower layer as indicated by the arrow 625.

In reference to FIG. 5C, after receiving the encoded multimedia data at the block 545, the process 540 continues at block 555, where the lower layer organizes descriptive information about the received multimedia data. The actions performed at the block 555 may be similar to those performed at the block 510 of the process 500 illustrated in FIG. 5A. The descriptive information may include any or all of the information discussed above such as the information illustrated in Tables 3 and 4.

After organizing the descriptive information at the block 555, the process 540 continues at block 560 where instructions related to processing of the multimedia data are determined. The instructions may be determined based on the error distribution and other descriptive information organized at the block 555. In addition, the lower layer receives feedback from the upper layer in the process 540. The feedback may include information related to the processing of the multimedia data in the upper layer. The feedback may include information such as processing time of specific portions of multimedia data, processing actions (e.g., error control actions) performed in the upper layer, and processing status (e.g., which frames have been decoded and displayed). The feedback may be used to reorganize the descriptive information at the block 555. Details of methods used to determine the instructions related to processing of the multimedia data at the block 560 are discussed below. The error control decision subsystem 306 of the decoder device 150 in FIG. 5A may perform the actions at the block 560.

At block 565, the lower layer subsystem provides the descriptive information and/or the instructions related to the processing of the multimedia data to the upper layer subsystem. The upper layer subsystem receives the descriptive information and/or instructions at the block 575. The multimedia decoder subsystem 308 may perform the actions at the blocks 565 and 575.

After receiving the descriptive information and/or instructions at the block 575, the process 540 continues at block 580 where the upper layer subsystem processes the multimedia data based on the instructions and/or the descriptive information. The actions performed at the block 580 may be similar to those performed at the block 535 of the method 520 illustrated in FIG. 5B. If the descriptive information contains a recommended "Action", the decoder subsystem performing the process 540 may or may not use the recommended action. As discussed above, the recommended action may comprise one or more error control techniques including, but not limited to, error recovery techniques, error concealment techniques or skipping decoding. The decoder device may or may not follow the recommended action depending on what data may be recovered during error recovery. For example, the lower layer process that organized the descriptive information at the block 555 may not have been able to identify how many frames were in a section of erroneous data. The upper layer error recovery techniques may be able to identify the number of frames in the section of erroneous data and may choose to perform some error recovery or concealment techniques that were not recommended in the "Action" field of the frame information table. The multimedia decoder subsystem 308 of the decoder device 150 shown in FIG. 1 can perform the acts at the block 580.

The process 540 continues at block 585 where the upper layer multimedia decoder instructs the lower layer with feedback information based on the processing performed in the upper layer actions 570. The feedback may include a processing time needed to decode a certain portion of multimedia data or a processing time that the portion of data was completely decoded. By comparing the completed processing time to a presentation time stamp of new multimedia data received at the block 545, the lower layer processes may instruct the upper layer to skip certain frames (e.g., B-frames) if the upper layer processing time shows indications of falling behind based on past processing performance. The feedback information received at the lower layer may be organized into the descriptive information organized at the block 555.

The feedback may also include details on the processing actions performed in the upper layer. For example the feedback may indicate the specific error control techniques and/or normal decoding actions that took place for specific frames or other portions of multimedia data. The feedback may also include the processing status (e.g., successful decoding of a frame or not). By including the processing action and processing status feedback information in the data organized at the block 555, the lower layer may adjust the instructions determined at block 560 based on the updated descriptive information. If processing is backed-up, the lower layer may instruct the upper layer to skip decoding of certain frames such as B-frames or enhancement layer data. The multimedia decoder subsystem 308 of the decoder device 150 shown in FIG. 1 can perform the actions at the block 585. It should be noted that some of the blocks of the process 540 may be combined, omitted, rearranged or any combination thereof.

Figure 7:
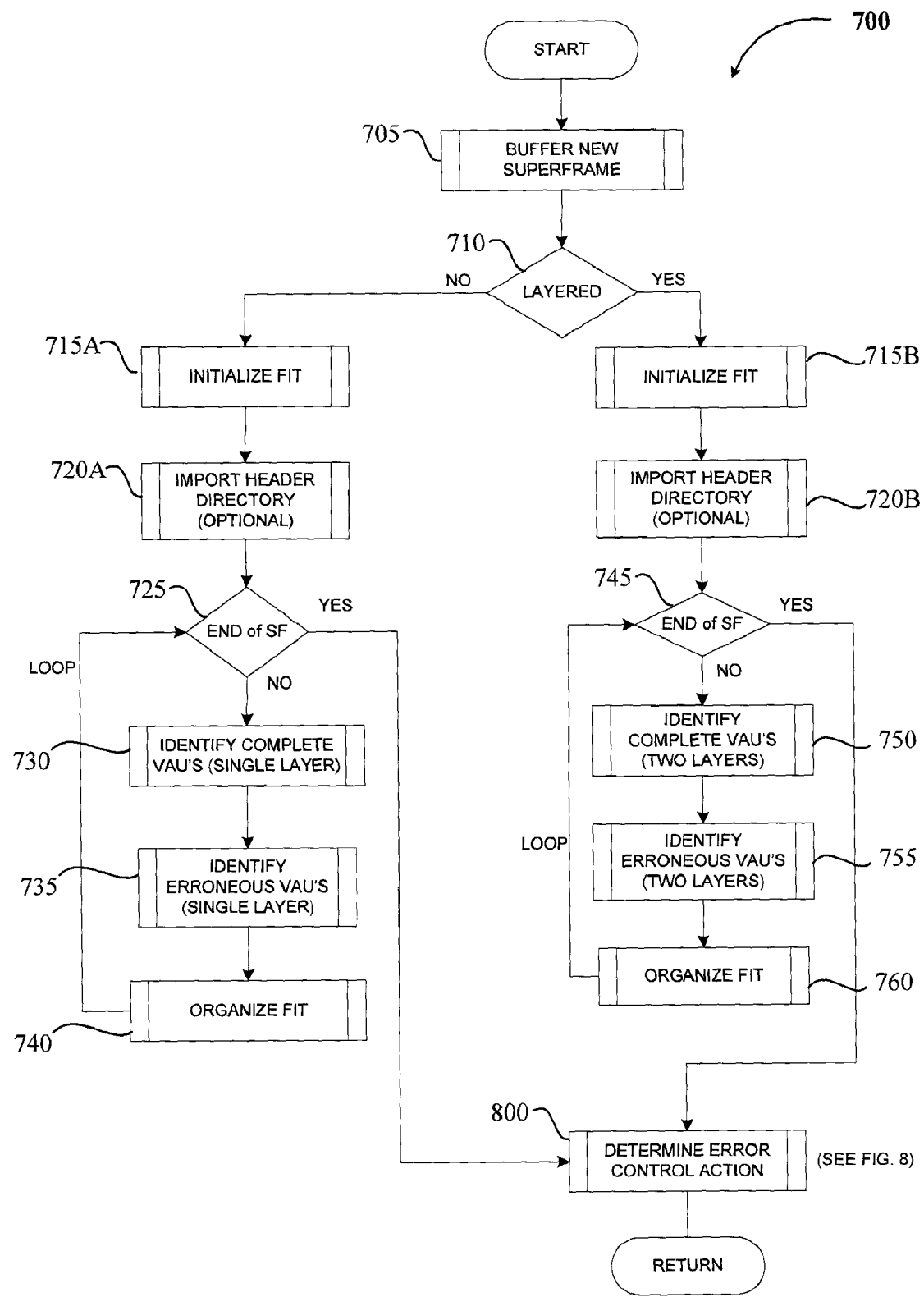
FIG. 7 is a flowchart illustrating an example of a method of organizing descriptive information that may be used to perform certain acts in the methods illustrated in FIGS. 5A and 5C.

FIG. 7 is a flowchart illustrating an example of a method of organizing descriptive information that may be used to perform certain acts in the methods illustrated in FIGS. 5A and 5C. The process 700 may be performed to organize the descriptive information at the block 510 of the process 500 illustrated in FIG. 5A or at the block 555 of the process 540 illustrated in FIG. 5C. The process 700 starts at block 705 where a superframe of multimedia data that was received at block 505 in the process 500, for example, is stored in a memory buffer. A super frame is a group of frames that typically are independently decodable. A superframe may include frames that cover a fixed time period ranging from about 0.2 seconds to about 2.0 seconds. Superframes may also be sized according to a fixed number of constituent frames, thereby having a variable time period. Superframe size may be chosen to allow for a reasonable acquisition time. After storing the superframe of multimedia data at the block 705, the process 700 continues at block 710 where a determination is made as to whether the data includes multiple layers (e.g., a base layer and one or more enhancement layers). If only a single layer of data is encoded in the superframe, the process 700 continues at block 715A. If two or more layers of data are encoded in the superframe, the process 700 continues at block 715B. A superframe header may contain a flag that indicates whether or not there are multiple layers within the superframe. At the blocks 715A or 715B, the frame information table (FIT) is initialized. Initializing the FIT may be performed to set fields to certain default values. After initializing the FIT, the process 700 proceeds to either block 720A or block 720B, depending on whether or not the superframe contains multiple layers. In either case, information contained in an optional header directory is imported at the block 720A or the block 720B. The header directory may contain any of the information as discussed above.

After the FIT is initialized at the block 715A or the block 715B, and the optional header directory imported at the block 720A or the block 720B, respectively, the process 700 proceeds to loop through the superframe at blocks 725-740 or blocks 745-760, respectively. At blocks 730 and 750, the decoder device identifies complete video access units (VAU) that it can identify through the header information that is available. The header information may include any of the fields in the transport header or the sync header (or any other header) as shown in Tables 1 and 2, for example. The information in the optional header directory may also be used. The VAUs in the process 700 are assumed to be frames, but other portions such as slices or blocks may also be identified at the block 730 or the block 750. After identifying a complete VAU, erroneous portions of video data within the identified VAU are identified at block 735 or block 755, respectively. The erroneous portions may be identified by header checksum failures, or transport layer checksum failures, etc. Numerous techniques for detecting erroneous data are known by skilled technologists in the art. The erroneous portions may be used to compile the error distribution information for the FIT (see PLP Error Distribution and PLP Error Rate fields in Table 4). After the erroneous portions of the VAUs are identified at the block 735 or the block 755, the FIT information is organized at the block 740 or the block 760, respectively. The information in the FIT may include any of the information discussed above in Table 4. The process 700 continues to loop through the superframes (blocks 725-740 or blocks 745-760) until the end of the superframe is identified at the decision block 725 or block 745. When the end of the superframe is identified, the process 700 continues to block 800 where the error control action is determined. The information organizer component 304 of the decoder device 150 in FIG. 3A can perform the actions of the process 700. It should be noted that some of the blocks of the process 700 may be combined, omitted, rearranged or any combination thereof.

Figure 8A:
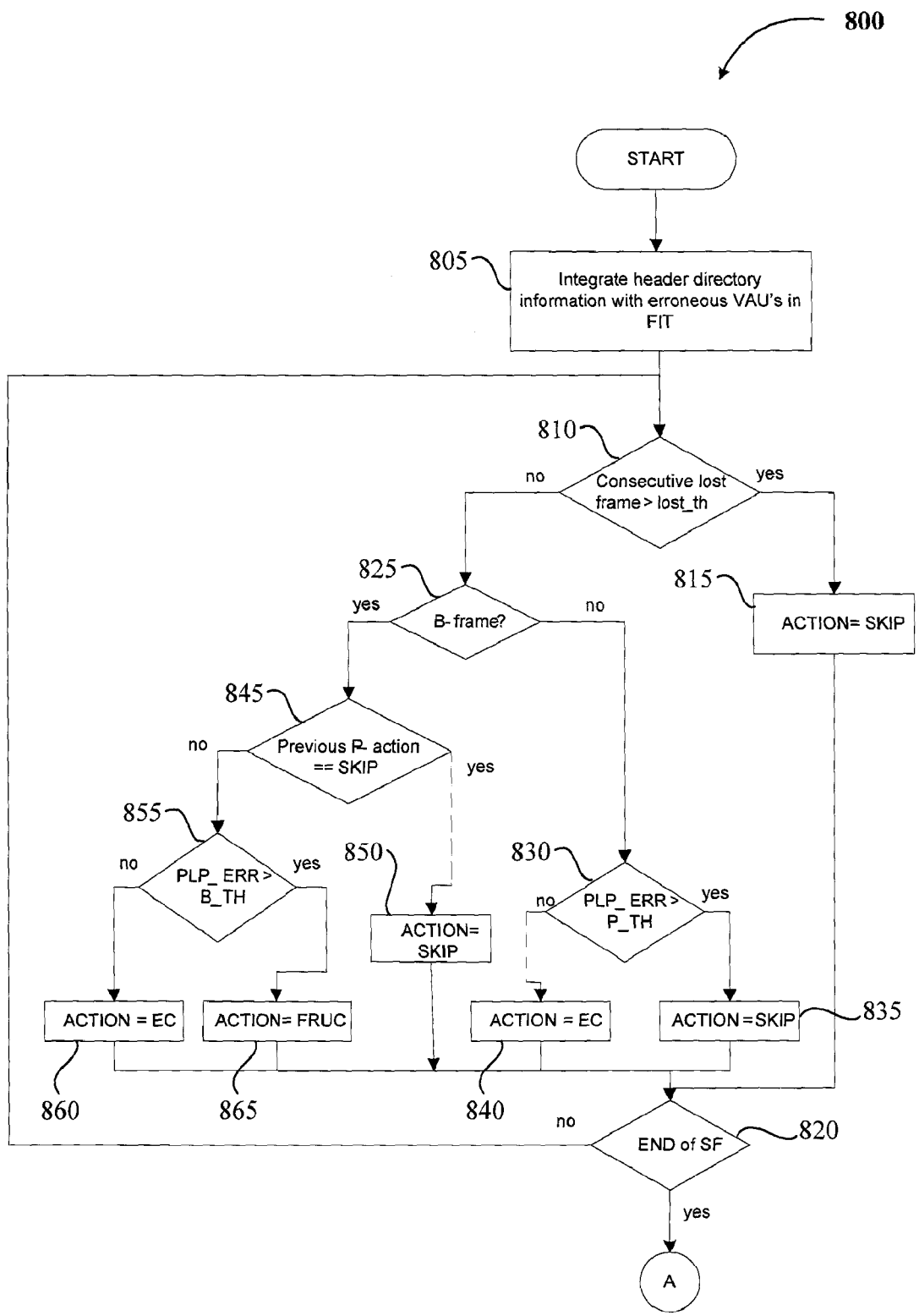
FIGS. 8A and 8B are flowcharts illustrating an example of a method of determining error control actions in the method illustrated in FIG. 7.
Figure 8B:
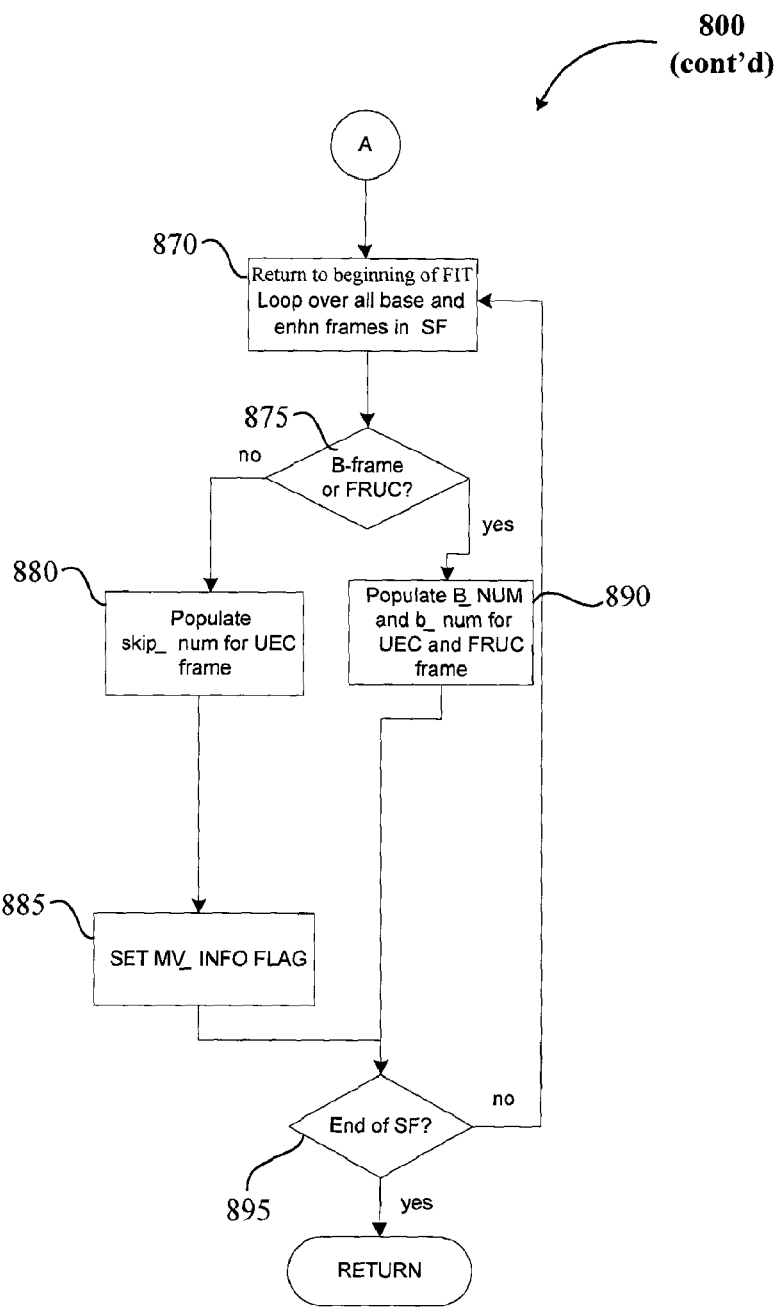

FIGS. 8A and 8B are flowcharts illustrating an example of a method of determining error control actions in the method illustrated in FIG. 7. The process 800 may also be performed to determine error control actions and provide the corresponding instructions at the block 515 of the process 500 illustrated in FIG. 5A, or at the blocks 560 and 565 of the process 540 illustrated in FIG. 5C. In one aspect, the process 800 is used to determine the error control actions to be provided to the upper layer. The error control actions are determined, for example, based on the error distribution and/or error rate of the multimedia frames. In another aspect, the process 800 identifies other portions of multimedia data that may be used by the upper layer in performing the recommended error control actions.

Figure 9:
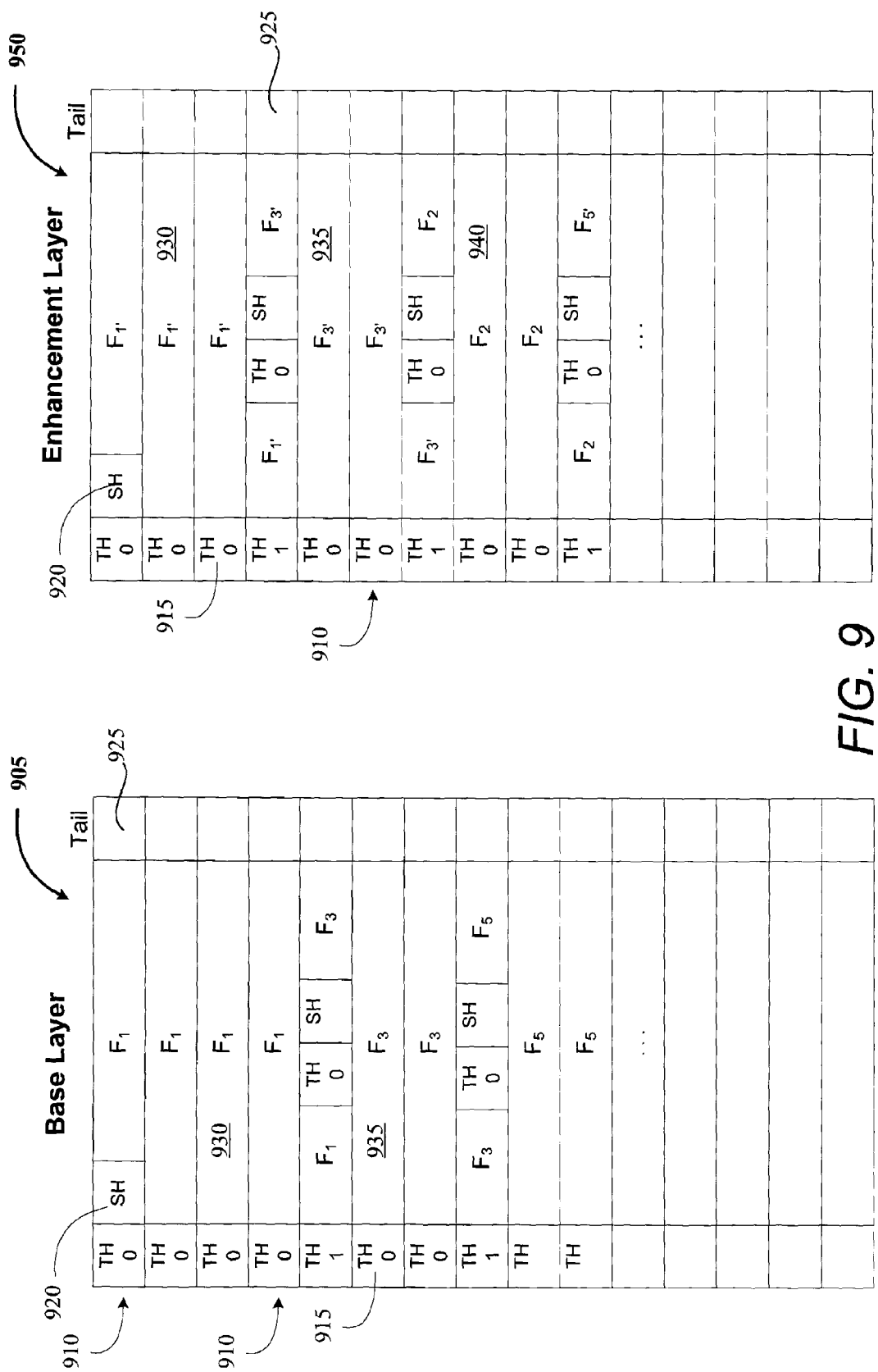
FIG. 9 depicts a structure of an example of physical layer packets including a scalable coded base layer and enhancement layer for use in a system such as illustrate in FIG. 1.

As discussed above, some multimedia data may be encoded in multiple layers such as a base layer (e.g., the most significant bits) and one or more enhancement layers (e.g., the least significant bits). The enhancement layers may also contain all data for B-frames. In these cases, the FIT contains portions for both the base and the enhancement layers and either or all of the layers may be erroneous. FIG. 9 depicts a structure of an example of physical layer packets including a scalable coded base layer and enhancement layer for use in a system such as illustrate in FIG. 1. A base layer 900 contains the multiple PLPs 910 containing transport layer headers 915, sync layer headers 920 and transport layer checksum tails 925. The base layer 905 may contain the most significant bits of I-frames such as frame 930 (labeled $F_1$), and P-frames such as frame 935 (labeled $F_3$). An enhancement layer 950 also contains PLPs 910, transport headers 915, sync headers 920 and transport layer checksums 925. The enhancement layer in this example contains the least significant bits of the I-frame 930 (labeled $F_{1'}$) and the P-frame 935 (labeled $F_{3'}$). In addition, the enhancement layer 950 contains sync layer packets for an entire B-frame 940 (labeled $F_2$) that is bi-directionally predicted from I-frame 930 and P-frame 935, where the base and enhancement layer pairs $F_1$, $F_{1'}$ and $F_3$, $F_{3'}$ are combined and decoded prior to constructing the B-frame $F_2$. The process 800 is designed with this form of scalable coding in mind.

The process 800 starts at block 805 where the decoder device integrates header information into portions of the FIT containing erroneous VAUs, such as those identified at the blocks 735 and 755 in the process 700 illustrated in FIG. 7. The header information may be obtained from correctly received transport and/or sync layer headers or from a header directory if one is received. If the erroneous data cannot be isolated to specific PLP's (e.g., due to loss of synchronization), the header directory information may be used to identify PLP boundaries and possibly populate the "PLP error Distribution" and/or "PLP error ratio" fields of the FIT. If a header directory is not available, the "PLP error ratio" may be set to 100%. The example method 800 uses the "PLP error ratio" in determining which error control "Action" to recommend. However, skilled technologists will recognize ways of utilizing the "PLP error distribution" information as well as other forms error data in determining the "Action."

After the fields of the FIT related to erroneous frames are populated at the block 805, the process 800 proceeds to loop through the frames in the superframe starting at block 810. At decision block 810, the decoder device examines the FIT PLP error ratio data and determines if the number of consecutive lost (i.e., erroneous) frames is greater than a threshold "lost_th." If the number of consecutive lost frames exceeds the threshold, then the process 800 continues at block 815 where the "Action" field of the FIT for the lost frames is set to a value recommending to skip decoding of the lost frames. The "lost_th" threshold may be set to a number of frames where the other error control techniques are determined to be ineffective or sufficiently degraded so as to not be warranted. The threshold "lost_th" may be in a range from about 3 frames to about 6 frames. The performance of temporal concealment techniques typically are degraded when being performed at a temporal distance greater than 3 frames for a frame rate of 30 frames per second. Faster frame rates may allow for a greater threshold, such as from about 6 frames to about 12 frames at a frame rate of 60 frames per second. After setting the "Action" for the lost frames to skip at the block 815, the process 800 continues to decision block 820. If the end of the super frame has been reached, then the process continues on to the remaining portion of the process illustrated in FIG. 8B. If more frames remain to be processed, the process 800 continues back to the decision block 810.

At decision block 810, if the number of consecutive lost frames does not exceed the threshold (including the case of a completely non-erroneous frame), the process 800 continues at decision block 825 where the "frame type" field of the FIT is used to determine if the current frame is a B-frame. The error control actions performed on B-frames are different than those performed on P-frames and I-frames in this example. If the current frame is not a B-frame, the process 800 continues at decision block 830 where the PLP error ratio (PLP_ERR) is compared to a threshold P_TH. The threshold P_TH sets a limit on the PLP error ratio for which normal error concealment techniques (e.g., spatial and temporal error concealment) are effective. The P_TH threshold may be in a range of about 20% to about 40%. If the PLP error ratio exceeds the P_TH threshold, the "Action" for the current frame is set equal to skip at block 835. If the PLP error ratio does not exceed the threshold, the "Action" for the current frame is set to a value at block 840 indicating that normal error concealment (EC) be performed. After setting the "Action" for the current frame at the block 835 or the block 840, the process 800 continues to decision block 820 and loops back to block 810 if more frames remain in the superframe as discussed above.

Returning to the decision block 825, the process 800 continues to decision block 845 if the current frame is determined to be a B-frame. In the example shown, it is assumed that B-frames are located between an I-frame and a P-frame, or between two P-frames. If the "Action" of the previous frame was determined to be a skip "Action", the process 800 sets the "Action" of the current B-frame also to be a skip at block 850. Since the data from which the current B-frame was predicted is not available, the normal construction of the B-frame is not feasible and the other error concealment options may also be degraded.

Returning to the decision block 845, if the "Action" of the previous frame was not determined to be a skip, then the process 800 continues to block 855, where the PLP error ratio is compared to another threshold B_TH. If the PLP error ration is greater than B_TH, the "Action" for the current frame is set to FRUC at block 860, otherwise the "Action" for the current frame is set to normal error concealment at block 865. The normal error concealment for B-frames in this example is temporal prediction from two decoded frames. The frames usually comprise a frame previous to the B-frame and a frame subsequent to the B-frame. However, two previous or two subsequent B-frames may also be used. Spatial concealment using non-erroneous portions of the current B-frame may also be used with the normal error concealment determined at the block 860. The threshold B_TH may be higher than the threshold P_TH used for P-frames since there are two reference frames to choose from and it is not required to use both in the prediction. However, in some cases FRUC may be more robust and may conceal better than normal error concealment and therefore the value of B_TH may be set to a lower value than P_TH. The value of B_TH and P_TH may depend on conditions such as the type of channel conditions and how the errors are introduced. The concealment used in FRUC may be similar to the normal B-frame error concealment, but it is performed for the whole frame.

After the "Action" decision has been made for all the frames in the superframe, at the decision block 820, the process 800 continues to block 870 in FIG. 8B. The loop from blocks 875 through 895 populates the FIT table with information that may be used in the upper layer to perform the decided "Action." At the block 870, the process 800 starts another pass through the FIT, starting at the beginning, and loops through all the base and enhancement layer frames.

At decision block 875, if the current frame is not a B-frame or a frame to be concealed using FRUC, the process continues at block 880 where the FIT table is populated with a variable skip_num that is used for temporal error concealment. The skip_num variable indicates the number of frames away in time from the current frame that the current frame is to be predicted from using the temporal error concealment.

Figure 10A:
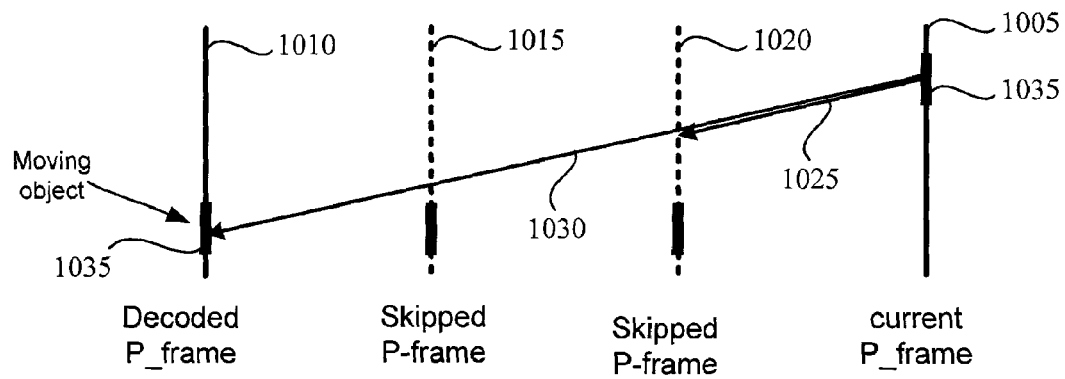
FIG. 10A graphically illustrates positions of a current P-frame and a previously decoded P-frame positioned three frames prior to the current frame.

FIG. 10A graphically illustrates the positions of the current P-frame 1005 and a previously decoded P-frame 1010 positioned three frames prior to the current frame. In this example, the skip_num variable would be set equal to three. Thus, the P-frames 1015 and 1020 which were skipped by the decoder will not be used. Instead, the motion vectors 1025 of the current P-frame 1005 can be scaled (see scaled motion vector 1030) to point at the previously decoded P-frame 1010. FIG. 10A illustrates the frames as one dimensional, where they are actually two dimensional and the motion vector 1025 points to a two dimensional position in a previous frame. In the example of FIG. 10A, an object 1035 in frame 1010 moves up in the frame 1005. If the motion of the object is relatively constant a linear extrapolation of the motion vector 1025 may accurately point to the correct position in frame 1010, thereby repositioning object 1035 upwards in frame 1005. The display position of the object 1035 may be held constant in skipped frames 1015 and 1020.

Figure 10B:
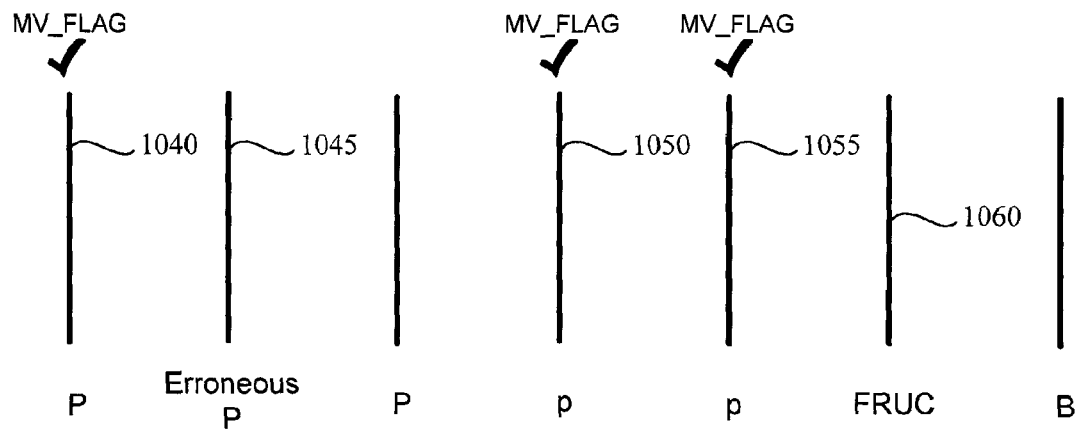
FIG. 10B graphically illustrates flagging of decoded frames used for error concealment for other erroneous frames.

Returning to FIG. 8B, after determining the skip_num variable for the current frame, the process 800 continues at block 885 where a flag MV_FLAG of the frame indicated by the skip_num variable is set to a value indicating to the upper layer decoder that the decoded values of the frame should be saved for future error concealment. FIG. 10B graphically illustrates the flagging of decoded frames used for error concealment for other erroneous frames. In the example of FIG. 10B, the decoded frame 1040 is flagged to be used to conceal erroneous frame 1045 using the normal error concealment. The decoded frames 1050 and 1055 are both flagged to be used to perform FRUC for frame 1060. These are only examples and other combinations of forward and/or backward located frames may be used for normal error concealment and FRUC.

Returning to FIG. 8B, after setting the Mv_FLAG of the frame(s) to be used to conceal the current frame, the process 800 continues at block 895. At block 895, the decoder checks to see if the end of the superframe has been reached. The process 800 ends for the current superframe if the end of the superframe has been detected. If more frames remain in the superframe, the process 800 returns to decision block 875 to loop through the remaining frames.

Figure 10C:
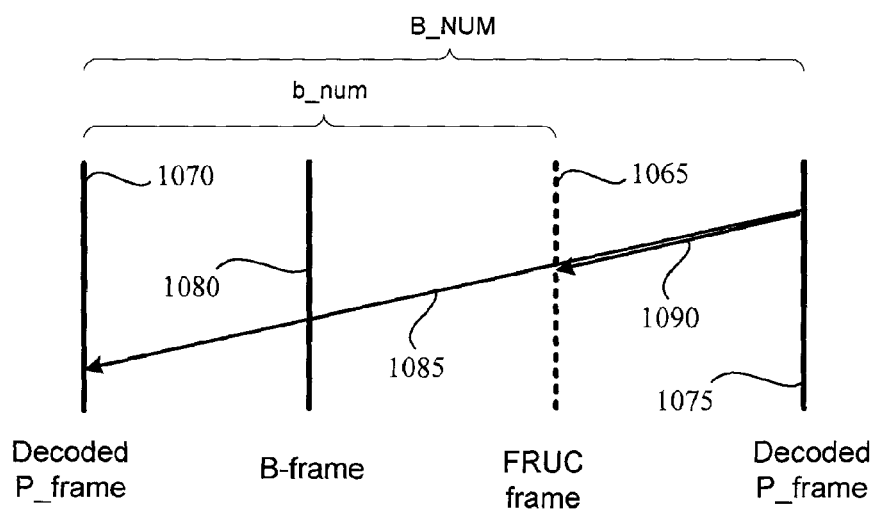
FIG. 10C graphically illustrates variables used to indicate positions of two decoded frames used to conceal an erroneous frame using FRUC.

At block 875, if the current frame is a B-frame or a frame to be concealed using FRUC, the process 800 continues at block 890 where the variables B_NUM and b_num locating the position of two frames to perform the bi-directional prediction are determined. FIG. 10C graphically illustrates the variables used to indicate the positions of two decoded frames used to conceal an erroneous frame using FRUC (the same variables can be used for an erroneous B-frame). A current erroneous frame 1065 has been determined to be concealed using FRUC. The variable b_num is set to two to indicate that a previous frame 1070 position two frame away is a first reference frame. In the example shown, the frame 1075 is predicted from the frame 1070 using the received motion vectors 1085. The variable B_NUM is set equal to 3 to indicate that a frame 1075 located three frames forward of the frame 1070 is a second reference frame. In the example shown, the decoded frame 1075 is predicted from the frame 1070 using the received motion vectors 1085. The received motion vectors 1085 can be scaled, resulting in scaled motion vectors 1090, to point to the erroneous frame 1065. The decoded portions located by the received motion vectors 1085 in frames 1075 and 1070 can then be used to conceal the portion of the frame 1065 located by the scaled motion vector 1090. In this example, a B-frame 1080 was not used to conceal the frame 1065 (B-frames are typically not used for prediction). Typically, the closest correctly decoded frames will be used for performing error concealment. The two decoded frames may also both be forward or backward of the erroneous frame being concealed.

After populating the FIT with the B_NUM and b_num variables at the block 890, the process continues to loop through blocks 875-895 until the FIT for the entire superframe is populated, at which point the process 800 ends. In one aspect the FIT is populated using the processes 700 and the process 800 for all the frames in the superframe before the individual frames and FIT are forwarded to the upper layer to be decoded. In this way, the frames can be forwarded in the order in which they are to be decoded. In addition, frames that are to be skipped may or may not be forwarded. In another aspect, the frames and corresponding entries of the FIT may be forwarded to the upper layer as soon as the processes 700 and 800 are both completed for a frame. The error control decision subsystem 306 of the decoder device 150 in FIG. 3A can perform the actions of the process 800.

The example processes 700 and 800 used frames as the VAU. However, the VAUs may also be slices or blocks of pixels and the FIT may be populated for these portions instead of frames. It should be noted that some of the blocks of the processes 700 and 800 may be combined, omitted, rearranged or any combination thereof.

Figure 11:
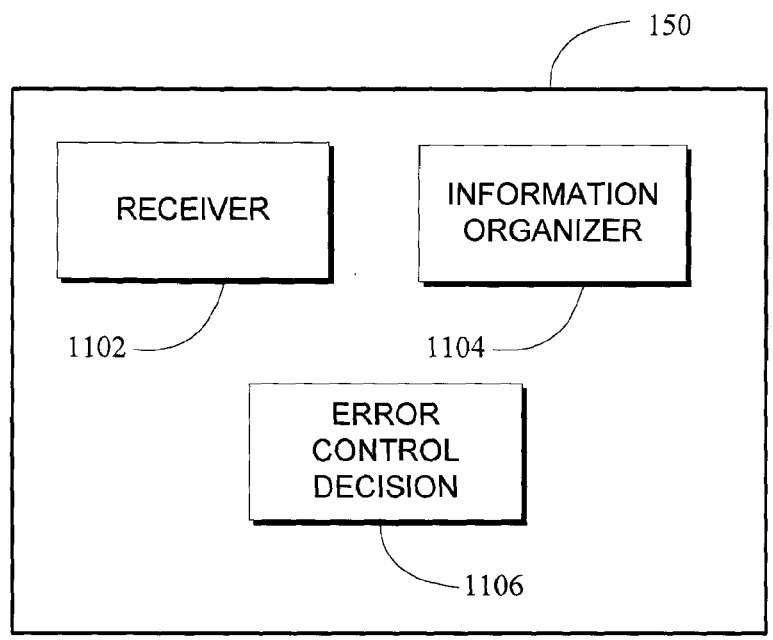
FIG. 11 is a functional block diagram illustrating another example of a decoder device 150 that may be used in a system such as illustrated in FIG. 1.

FIG. 11 is a functional block diagram illustrating another example of a decoder device 150 that may be used for processing multimedia data in a system such as illustrated in FIG. 1. This aspect includes means for receiving the multimedia data, means for organizing descriptive information about the multimedia data in a first layer, wherein the descriptive information is related to the processing of the multimedia data in a second layer, and means for providing instructions related to the processing of the multimedia data in the second layer based at least in part on the descriptive information. Some examples of this aspect include where the receiving means comprises a receiver 1102, where the organizing means comprises an information organizer subsystem 1104, and where the providing means comprises an error control decision subsystem 1106.

Figure 12:
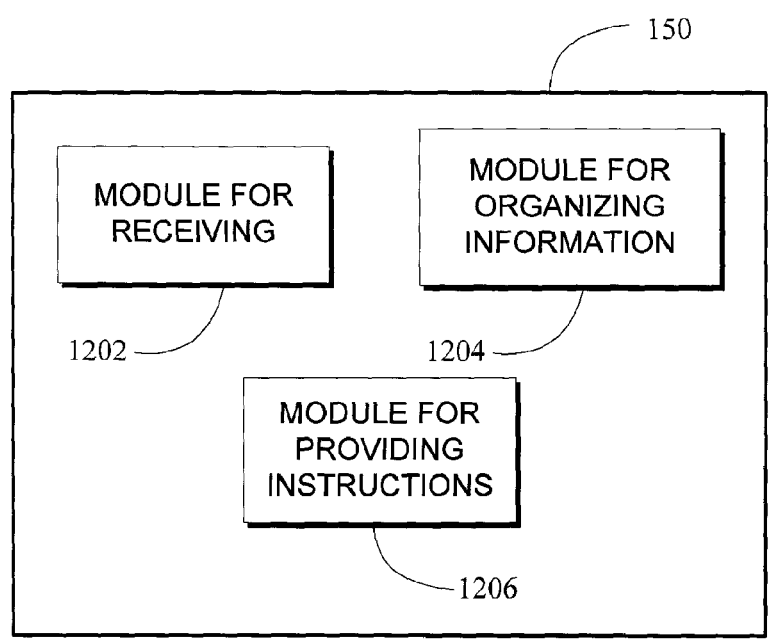
FIG. 12 is a functional block diagram illustrating another example of a decoder device 150 that may be used in a system such as illustrated in FIG. 1.

FIG. 12 is a functional block diagram illustrating another example of a decoder device 150 that may be used for processing multimedia data in a system such as illustrated in FIG. 1. This aspect includes means for receiving the multimedia data, means for organizing descriptive information about the multimedia data in a first layer, wherein the descriptive information is related to the processing of the multimedia data in a second layer, and means for providing instructions related to the processing of the multimedia data in the second layer based at least in part on the descriptive information. Some examples of this aspect include where the receiving means comprises a module for receiving 1202, where the organizing means comprises a module for organizing information 1204, and where the providing means comprises a module for providing instructions 1206.

Figure 13:
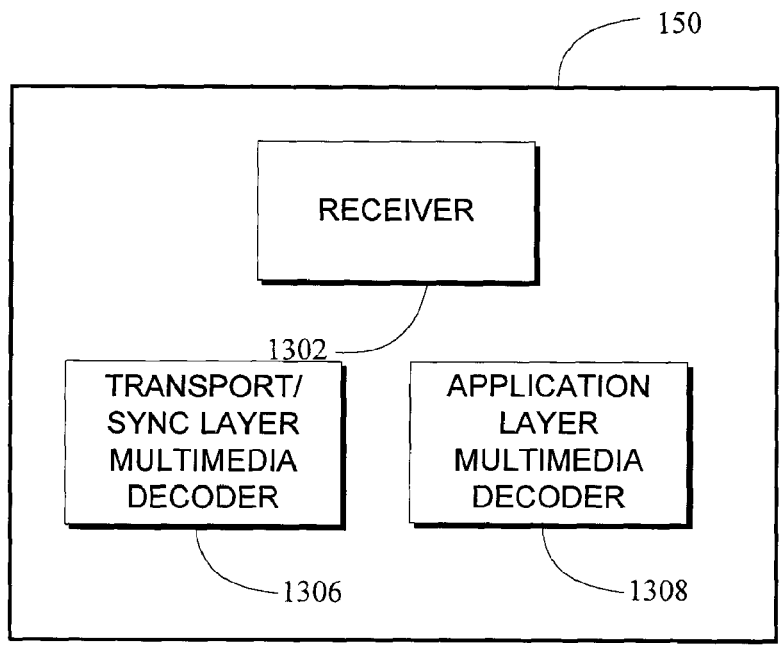
FIG. 13 is a functional block diagram illustrating another example of a decoder device 150 that may be used in a system such as illustrated in FIG. 1.

FIG. 13 is a functional block diagram illustrating another example of a decoder device 150 that may be used for processing multimedia data in a system such as illustrated in FIG. 1. This aspect includes means for receiving the multimedia data, means for processing the multimedia data in an upper layer, means for instructing a lower layer based at least in part on information associated with the processing of the multimedia data in the upper layer, and means for processing the multimedia data in the lower layer based at least in part on the information associated with the processing of the multimedia data in the upper layer. Some examples of this aspect include where the receiving means comprises a receiver 1302, where the upper layer processing means comprises an application layer multimedia decoder subsystem 1308, where the means for instructing comprises the application layer multimedia decoder subsystem 1308, and where the lower layer processing means comprises a transport/sync layer multimedia decoder subsystem 1306.

Figure 14:
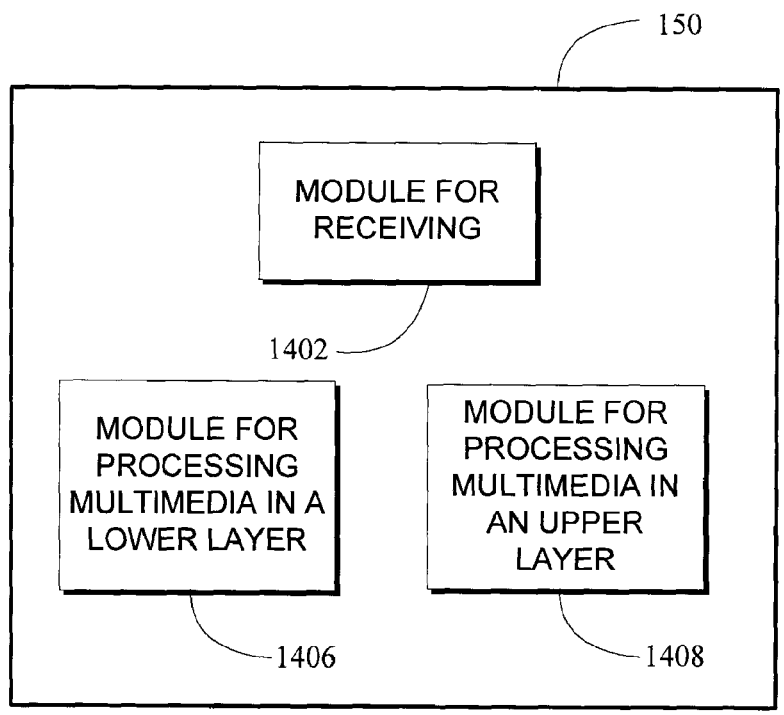
FIG. 14 is a functional block diagram illustrating another example of a decoder device 150 that may be used in a system such as illustrated in FIG. 1.

FIG. 14 is a functional block diagram illustrating another example of a decoder device 150 that may be used for processing multimedia data in a system such as illustrated in FIG. 1. This aspect includes means for receiving the multimedia data, means for processing the multimedia data in an upper layer, means for instructing a lower layer based at least in part on information associated with the processing of the multimedia data in the upper layer, and means for processing the multimedia data in the lower layer based at least in part on the information associated with the processing of the multimedia data in the upper layer. Some examples of this aspect include where the receiving means comprises a module for receiving 1402, where the upper layer processing means comprises a module for processing multimedia in an upper layer 1408, where the means for instructing comprises the module for processing multimedia in the lower layer 1408, and where the lower layer processing means comprises a module for processing multimedia data in a lower layer 1406.

Figure 15:
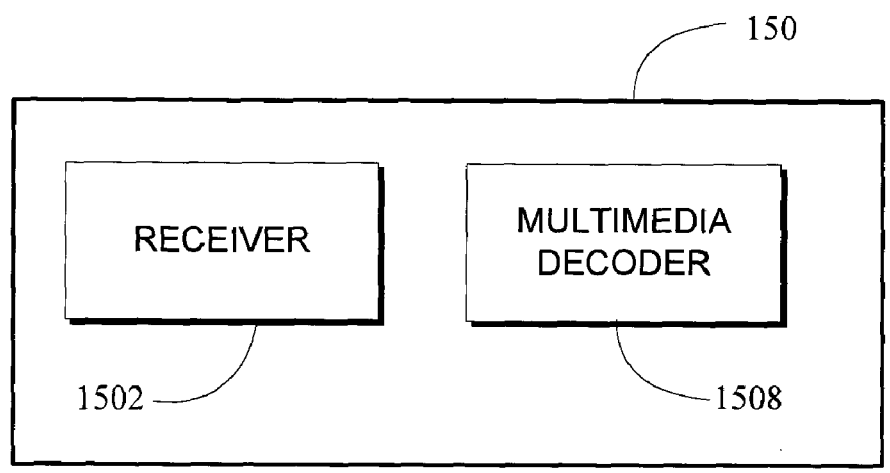
FIG. 15 is a functional block diagram illustrating another example of a decoder device 150 that may be used in a system such as illustrated in FIG. 1.

FIG. 15 is a functional block diagram illustrating another example of a decoder device 150 that may be used for processing multimedia data in a system such as illustrated in FIG. 1. This aspect includes means for receiving the multimedia data, means for receiving descriptive information about the multimedia data from a first layer, wherein the descriptive information is related to the processing of the multimedia data in a second layer, and means for processing the multimedia data in the second layer based at least in part on the received descriptive information. Some examples of this aspect include where the means for receiving the multimedia data comprises a receiver 1502, where the means for receiving descriptive information comprises a multimedia decoder 1508, and where the processing means comprises the multimedia decoder 1508.

Figure 16:
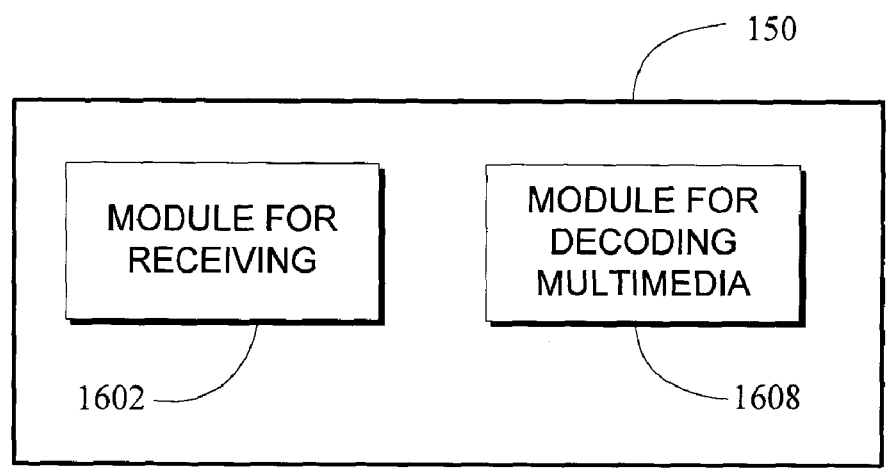
FIG. 16 is a functional block diagram illustrating another example of a decoder device 150 that may be used in a system such as illustrated in FIG. 1.

FIG. 16 is a functional block diagram illustrating another example of a decoder device 150 that may be used for processing multimedia data in a system such as illustrated in FIG. 1. This aspect includes means for receiving the multimedia data, means for receiving descriptive information about the multimedia data from a first layer, wherein the descriptive information is related to the processing of the multimedia data in a second layer, and means for processing the multimedia data in the second layer based at least in part on the received descriptive information. Some examples of this aspect include where the means for receiving the multimedia data comprises a module for receiving 1602, where the means for receiving descriptive information comprises a module for decoding multimedia 1608, and where the processing means comprises the module for decoding multimedia 1608.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core or ASIC core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, an optical storage medium, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to perform highly efficient and robust error control of multimedia data have been described.

What is claimed is:

1. A method of processing multimedia data comprising:
receiving the multimedia data;
organizing descriptive information about the multimedia data in a first layer, wherein the descriptive information is related to the processing of the multimedia data in a second layer; and
providing instructions related to the processing of the multimedia data in the second layer based at least in part on the descriptive information, the providing instructions including determining a method of error control based at least in part on error distribution information and providing instructions to the second layer related to the determined method of error control.

2. The method of claim 1, further comprising passing the descriptive information to the second layer.

3. The method of claim 1, wherein the descriptive information comprises one or more of frame characteristic information, base or enhancement data identifying information, timing information, an encoding type, a frame type, synchronization information, and predictive encoding related information.

4. The method of claim 1, wherein the multimedia data comprises some erroneous data, the method further comprising organizing the descriptive information to include information representing an error distribution of the erroneous data within the multimedia data.

5. The method of claim 4, further comprising determining the instructions based at least in part on the error distribution information.

6. The method of claim 1, further comprising changing the processing of the multimedia data in the second layer based at least in part on the instructions.

7. The method of claim 1, wherein the descriptive information comprises metadata.

8. The method of claim 1, wherein the determined method of error control comprises one or more of error recovery, error concealment, and interpolation of a frame.

9. An apparatus for processing multimedia data comprising:
a receiver implemented in hardware configured to receive the multimedia data;
an information organizer configured to organize descriptive information about the multimedia data in a first layer, wherein the descriptive information is related to the processing of the multimedia data in a second layer; and
an error control decision subsystem configured to provide instructions related to the processing of the multimedia data in the second layer based at least in part on the descriptive information, the error control decision subsystem configured to determine a method of error control based at least in part on error distribution information, the instructions provided to the second layer being related to the determined method of error control.

10. The apparatus of claim 9, wherein the information organizer is further configured to pass the descriptive information to the second layer.

11. The apparatus of claim 9, wherein the descriptive information comprises one or more of frame characteristic information, base or enhancement data identifying information, timing information, an encoding type, a frame type, synchronization information, and predictive encoding related information.

12. The apparatus of claim 9, wherein the multimedia data comprises some erroneous data, and the multimedia data processor is further configured to organize the descriptive information to include information representing an error distribution of the erroneous data within the multimedia data.

13. The apparatus of claim 12, wherein the error control decision subsystem is further configured to determine the instructions based at least in part on the error distribution information.

14. The apparatus of claim 9, further comprising a multimedia decoder configured to change the processing of the multimedia data in the second layer based at least in part on the instructions.

15. The apparatus of claim 9, wherein the descriptive information comprises metadata.

16. The apparatus of claim 9, wherein the determined method of error control comprises one or more of error recovery, error concealment, and interpolation of a frame.

17. An apparatus for processing multimedia data comprising:
means for receiving the multimedia data;
means for organizing descriptive information about the multimedia data in a first layer, wherein the descriptive information is related to the processing of the multimedia data in a second layer; and
means for providing instructions related to the processing of the multimedia data in the second layer based at least in part on the descriptive information, the means for providing instructions including means for determining a method of error control based at least in part on error distribution information, the instructions provided to the second layer being related to the determined method of error control.

18. The apparatus of claim 17, further comprising means for passing the descriptive information to the second layer.

19. The apparatus of claim 17, wherein the descriptive information comprises one or more of frame characteristic information, base or enhancement data identifying information, timing information, an encoding type, a frame type, synchronization information, and predictive encoding related information.

20. The apparatus of claim 17, wherein the multimedia data comprises some erroneous data, wherein the organizing means organizes the descriptive information to include information representing an error distribution of the erroneous data within the multimedia data.

21. The apparatus of claim 20, further comprising means for determining the instructions based at least in part on the error distribution information.

22. The apparatus of claim 17, further comprising means for changing the processing of the multimedia data in the second layer based at least in part on the instructions.

23. The apparatus of claim 17, wherein the descriptive information comprises metadata.

24. The apparatus of claim 17, wherein the determined method of error control comprises one or more of error recovery, error concealment, and interpolation of a frame.

25. A non-transitory machine readable medium comprising program code, which, when executed on one or more machines, causes the one or more machines to perform program operations, the program code comprising:
code for receiving multimedia data;
code for organizing descriptive information about the multimedia data in a first layer, wherein the descriptive information is related to the processing of the multimedia data in a second layer;
code for providing instructions related to the processing of the multimedia data in the second layer based at least in part on the descriptive information; and
code for determining a method of error control based at least in part on error distribution information, the instructions provided to the second layer being related to the determined method of error control.

26. The machine readable medium of claim 25, further comprising code for passing the descriptive information to the second layer.

27. The machine readable medium of claim 25, wherein the descriptive information comprises one or more of frame characteristic information, base or enhancement data identifying information, timing information, an encoding type, a frame type, synchronization information, and predictive encoding related information.

28. The machine readable medium of claim 25, wherein the multimedia data comprises some erroneous data, and further comprising code for organizing the descriptive information to include information representing an error distribution of the erroneous data within the multimedia data.

29. The machine readable medium of claim 28, further comprising code for determining the instructions based at least in part on the error distribution information.

30. The machine readable medium of claim 25, further comprising code for changing the processing of the multimedia data in the second layer based at least in part on the instructions.

31. The machine readable medium of claim 25, wherein the descriptive information comprises metadata.

32. The machine readable medium of claim 25, wherein the determined method of error control comprises one or more of error recovery, error concealment, and interpolation of a frame.

33. A method of processing multimedia data comprising:
receiving the multimedia data;
processing the multimedia data in an upper layer, the processing including determining a method of error control based at least in part on error distribution information;
instructing a lower layer based at least in part on information associated with the processing of the multimedia data in the upper layer, the instructing related to the determined method of error control; and
processing the multimedia data in the lower layer based at least in part on the information associated with the processing of the multimedia data in the upper layer.

34. The method of claim 33, further comprising organizing descriptive information in the lower layer about the multimedia data based at least in part on the information associated with the processing of the multimedia data in the upper layer.

35. The method of claim 34, further comprising providing instructions related to the processing of the multimedia data in the upper layer based at least in part on the descriptive information.

36. The method of claim 34, wherein the descriptive information comprises metadata.

37. The method of claim 34, wherein the descriptive information comprises one or more of frame characteristic information, base or enhancement data identifying information, timing information, an encoding type, a frame type, synchronization information, and predictive encoding related information.

38. The method of claim 33, wherein instructing the lower layer comprises passing information comprising one or more of processing time, processing action and processing status.

39. An apparatus for processing multimedia data comprising:
a receiver implemented in hardware configured to receive the multimedia data;
an upper layer decoder subsystem configured to process the multimedia data in an upper layer, and to instruct a lower layer based at least in part on information associated with the processing of the multimedia data in the upper layer, the processing including determining a method of error control based at least in part on error distribution information, the instructing related to the determined method of error control; and
a lower layer decoder subsystem configured to process the multimedia data in the lower layer based at least in part on the information associated with the processing of the multimedia data in the upper layer.

40. The apparatus of claim 39, further comprising an information organizer configured to organize descriptive information in the lower layer about the multimedia data based at least in part on the information associated with the processing of the multimedia data in the upper layer.

41. The apparatus of claim 40, further comprising an error control decision subsystem configured to provide instructions related to the processing of the multimedia data in the upper layer based at least in part on the descriptive information.

42. The apparatus of claim 40, wherein the descriptive information comprises metadata.

43. The apparatus of claim 40, wherein the descriptive information comprises one or more of frame characteristic information, base or enhancement data identifying information, timing information, an encoding type, a frame type, synchronization information, and predictive encoding related information.

44. The apparatus of claim 39, wherein the upper layer decoder subsystem is further configured to instruct the lower layer by passing information comprising one or more of processing time, processing action and processing status.

45. An apparatus for processing multimedia data comprising:
means for receiving the multimedia data;
means for processing the multimedia data in an upper layer, the processing including determining a method of error control based at least in part on error distribution;
means for instructing a lower layer based at least in part on information associated with the processing of the multimedia data in the upper layer, the instructing related to the determined method of error control; and
means for processing the multimedia data in the lower layer based at least in part on the information associated with the processing of the multimedia data in the upper layer.

46. The apparatus of claim 45, further comprising means for organizing descriptive information in the lower layer about the multimedia data based at least in part on the information associated with the processing of the multimedia data in the upper layer.

47. The apparatus of claim 46, further comprising means for providing instructions related to the processing of the multimedia data in the upper layer based at least in part on the descriptive information.

48. The apparatus of claim 46, wherein the descriptive information comprises metadata.

49. The apparatus of claim 46, wherein the descriptive information comprises one or more of frame characteristic information, base or enhancement data identifying information, timing information, an encoding type, a frame type, synchronization information, and predictive encoding related information.

50. The apparatus of claim 45, wherein the means for instructing the lower layer comprises means for passing information comprising one or more of processing time, processing action and processing status.

51. A non-transitory machine readable medium comprising program code, which, when executed on one or more machines, causes the one or more machines to perform program operations, the program code comprising:
code for receiving multimedia data;
code for processing the multimedia data in an upper layer;
code for determining a method of error control in the upper layer based at least in part on error distribution information;
code for instructing a lower layer based at least in part on information associated with the processing of the multimedia data in the upper layer, the instructing related to the determined method of error control; and
code for processing the multimedia data in the lower layer based at least in part on the information associated with the processing of the multimedia data in the upper layer.

52. The machine readable medium of claim 51, further comprising code for organizing descriptive information in the lower layer about the multimedia data based at least in part on the information associated with the processing of the multimedia data in the upper layer.

53. The machine readable medium of claim 52, further comprising code for providing instructions related to the processing of the multimedia in the upper layer based at least in part on the descriptive information.

54. The machine readable medium of claim 52, wherein the descriptive information comprises metadata.

55. The machine readable medium of claim 52, wherein the descriptive information comprises one or more of frame characteristic information, base or enhancement data identifying information, timing information, an encoding type, a frame type, synchronization information, and predictive encoding related information.

56. The machine readable medium of claim 51, further comprising code for instructing the lower layer by passing information comprising one or more of processing time, processing action and processing status.

57. A method of processing multimedia data comprising:
receiving the multimedia data;
receiving descriptive information about the multimedia data from a first layer, wherein the descriptive information is related to the processing of the multimedia data in a second layer;
receiving an instruction in the second layer, the instruction based on a method of error control determined based at least in part on error distribution information; and
processing the multimedia data in the second layer based at least in part on the received descriptive information and the received instruction.

58. The method of claim 57,
wherein the instruction is based at least in part on the descriptive information.

59. The method of claim 58, wherein the received instruction is related to a method of error control.

60. The method of claim 59, wherein the method of error control comprises one or more of error recovery, error concealment, and interpolation of a frame.

61. The method of claim 57, wherein the descriptive information comprises metadata.

62. The method of claim 57, wherein the descriptive information comprises one or more of frame characteristic information, base or enhancement data identifying information, timing information, an encoding type, a frame type, synchronization information, and predictive encoding related information.

63. An apparatus for processing multimedia data comprising:
a receiver implemented in hardware configured to receive the multimedia data; and
a decoder configured to receive descriptive information about the multimedia data from a first layer, wherein the descriptive information is related to the processing of the multimedia data in a second layer, the decoder configured to receive an instruction in the second layer, the instruction based on a method of error control determined based at least in part on error distribution information, and to process the multimedia data in the second layer based at least in part on the received descriptive information and the received instruction.

64. The apparatus of claim 63, wherein the instruction is based at least in part on the descriptive information.

65. The apparatus of claim 64, wherein the received instruction is related to a method of error control.

66. The apparatus of claim 65, wherein the method of error control comprises one or more of error recovery, error concealment, and interpolation of a frame.

67. The apparatus of claim 63, wherein the descriptive information comprises metadata.

68. The apparatus of claim 63, wherein the descriptive information comprises one or more of frame characteristic information, base or enhancement data identifying information, timing information, an encoding type, a frame type, synchronization information, and predictive encoding related information.

69. An apparatus for processing multimedia data comprising:
means for receiving the multimedia data;
means for receiving descriptive information about the multimedia data from a first layer, wherein the descriptive information is related to the processing of the multimedia data in a second layer;
means for receiving an instruction in the second layer, the instruction based on a method of error control determined based at least in part on error distribution information; and
means for processing the multimedia data in the second layer based at least in part on the received descriptive information and the received instruction.

70. The apparatus of claim 69,
wherein the instruction is based at least in part on the descriptive information.

71. The apparatus of claim 70, wherein the received instruction is related to a method of error control.

72. The apparatus of claim 71, wherein the method of error control comprises one or more of error recovery, error concealment, and interpolation of a frame.

73. The apparatus of claim 69, wherein the descriptive information comprises metadata.

74. The apparatus of claim 69, wherein the descriptive information comprises one or more of frame characteristic information, base or enhancement data identifying information, timing information, an encoding type, a frame type, synchronization information, and predictive encoding related information.

75. A non-transitory machine readable medium comprising program code, which, when executed on one or more machines, causes the one or more machines to perform program operations, the program code comprising:
code for receiving multimedia data;
code for receiving descriptive information about the multimedia data from a first layer, wherein the descriptive information is related to the processing of the multimedia data in a second layer;
code for receiving an instruction in the second layer, the instruction based on a method of error control determined based at least in part on error distribution information, and
code for processing the multimedia data in the second layer based at least in part on the received descriptive information and the received instruction.

76. The machine readable medium of claim 75,
wherein the instruction is based at least in part on the descriptive information.

77. The machine readable medium of claim 76, wherein the received instruction is related to a method of error control.

78. The machine readable medium of claim 77, wherein the method of error control comprises one or more of error recovery, error concealment, and interpolation of a frame.

79. The machine readable medium of claim 75, wherein the descriptive information comprises metadata.

80. The machine readable medium of claim 75, wherein the descriptive information comprises one or more of frame characteristic information, base or enhancement data identifying information, timing information, an encoding type, a frame type, synchronization information, and predictive encoding related information.

81. The method of claim 1, wherein organizing descriptive information comprises organizing the descriptive information into a data structure.

82. The method of claim 1, wherein organizing descriptive information comprises organizing the descriptive information on at least one of a frame level, a slice level, a pixel block level or a pixel level.

* * * * *